US012067996B2

(12) United States Patent
Dietz et al.

(10) Patent No.: US 12,067,996 B2
(45) **Date of Patent: *Aug. 20, 2024**

(54) CONCEPT FOR CODING MODE SWITCHING COMPENSATION

(71) Applicant: Fraunhofer-Gesellschaft zur Foerderung der angewandten Forschung e.V., Munich (DE)

(72) Inventors: Martin Dietz, Nuremberg (DE); Eleni Fotopoulou, Nuremberg (DE); Jérémie Lecomte, Fuerth (DE); Markus Multrus, Nuremberg (DE); Benjamin Schubert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,139

(22) Filed: Mar. 6, 2023

(65) Prior Publication Data

US 2023/0206931 A1 Jun. 29, 2023

Related U.S. Application Data

(63) Continuation of application No. 16/915,904, filed on Jun. 29, 2020, now Pat. No. 11,600,283, which is a (Continued)

(51) Int. Cl.

*G10L 19/04* (2013.01)
*G10L 19/18* (2013.01)
*G10L 21/038* (2013.01)

(52) U.S. Cl.

CPC .............. *G10L 19/04* (2013.01); *G10L 19/18* (2013.01); *G10L 21/038* (2013.01)

(58) Field of Classification Search

CPC ....... G10L 19/04; G10L 19/18; G10L 21/038; G10L 19/02; G10L 19/20; G10L 19/24; G10L 19/22; G10L 21/0364; G10L 19/012

See application file for complete search history.

(56) References Cited

U.S. PATENT DOCUMENTS 7,047,186 B2 * 5/2006 Oishi .................. G10L 21/0364 704/E21.009
7,079,596 B1 * 7/2006 Namura ................. H03D 7/166 375/324

(Continued)

FOREIGN PATENT DOCUMENTS

CN 101025918 A 8/2007
CN 101231850 A 7/2008

(Continued)

OTHER PUBLICATIONS

"Frame error robust narrow-band and wideband embedded variable bit-rate coding of speech and audio from 8-32 kbit/s" , Int'l Telecommunication Union; Recommendation ITU-"T G.718 (2008)—Amendment 2 "New Annex B on superwideband scalable extension for ITU-T G.718 and corrections to main body fixed-point C-code and description text"; , Mar. 2010 , 60 pages.

(Continued)

*Primary Examiner* — Michael Colucci
(74) *Attorney, Agent, or Firm* — Perkins Coie LLP; Michael A. Glenn

(57) ABSTRACT

A codec allowing for switching between different coding modes is improved by, responsive to a switching instance, performing temporal smoothing and/or blending at a respective transition.

10 Claims, 13 Drawing Sheets

Related U.S. Application Data continuation of application No. 15/873,550, filed on Jan. 17, 2018, now Pat. No. 10,734,007, which is a continuation of application No. 14/812,263, filed on Jul. 29, 2015, now Pat. No. 9,934,787, which is a continuation of application No. PCT/EP2014/051565, filed on Jan. 28, 2014.

(60) Provisional application No. 61/758,086, filed on Jan. 29, 2013.

(56) References Cited

U.S. PATENT DOCUMENTS

| | | | | |
|---|---|---|---|---|
| 7,406,096 | B2 * | 7/2008 | El-Maleh | G10L 19/173 704/214 |
| 7,582,823 | B2 * | 9/2009 | Kim | G11B 27/28 84/602 |
| 7,626,111 | B2 * | 12/2009 | Kim | G11B 27/105 84/600 |
| 7,860,709 | B2 * | 12/2010 | Makinen | G10L 19/022 704/E19.01 |
| 8,244,525 | B2 * | 8/2012 | Makinen | G10L 19/22 704/200 |
| 8,275,626 | B2 * | 9/2012 | Neuendorf | G10L 21/04 704/200 |
| 8,321,210 | B2 * | 11/2012 | Grill | G10L 19/173 704/211 |
| 8,438,017 | B2 * | 5/2013 | Jeong | G10L 19/025 704/265 |
| 8,442,837 | B2 * | 5/2013 | Ashley | G10L 19/24 704/200 |
| 8,532,211 | B2 * | 9/2013 | Filipovic | H04B 7/0608 375/267 |
| 8,548,801 | B2 * | 10/2013 | Kim | G10L 19/20 704/200 |
| 8,880,411 | B2 * | 11/2014 | Philippe | G10L 19/022 381/23 |
| 2003/0004711 | A1 * | 1/2003 | Koishida | G10L 19/18 704/E19.041 |
| 2003/0219130 | A1 | 11/2003 | Baumgarte et al. | |
| 2005/0246164 | A1 | 11/2005 | Ojala et al. | |
| 2006/0031075 | A1 * | 2/2006 | Oh | G10L 19/04 704/E21.011 |
| 2008/0004869 | A1 | 1/2008 | Herre et al. | |
| 2009/0240509 | A1 * | 9/2009 | Song | G10L 19/0204 704/E21.001 |
| 2011/0038489 | A1 | 2/2011 | Visser et al. | |
| 2011/0153336 | A1 | 6/2011 | Grancharov et al. | |
| 2011/0202353 | A1 * | 8/2011 | Neuendorf | G10L 21/038 704/500 |
| 2012/0016667 | A1 * | 1/2012 | Gao | G10L 19/002 704/203 |
| 2012/0209597 | A1 | 8/2012 | Yamanashi | |
| 2013/0268265 | A1 * | 10/2013 | Jeong | G10L 19/012 704/205 |

FOREIGN PATENT DOCUMENTS

| | | | |
|---|---|---|---|
| CN | 101305423 | A | 11/2008 |
| CN | 102369569 | A | 3/2012 |
| EP | 2144231 | A1 | 1/2010 |
| EP | 2146343 | A1 | 1/2010 |
| EP | 2311035 | B1 | 1/2012 |
| EP | 2647974 | A1 | 10/2013 |
| JP | 2007532963 | A | 11/2007 |
| JP | 2014509408 | A | 4/2014 |
| RU | 2407071 | C2 | 12/2010 |
| TW | 201032220 | A | 9/2010 |
| WO | 2010003545 | A1 | 1/2010 |
| WO | 2011048820 | A1 | 4/2011 |

OTHER PUBLICATIONS

"G.729-based embedded variable bit-rate coder: An 8-32 kbit/s scalable wideband coder bitstream interoperable with G. 729" , Int'l Telecommunication Union; ITU-T G.729.1 Amendment 6 "New Annex E on superwideband scalable extension" , Mar. 2010 , 78 pages.

"Information technology—MPEG audio technologies—Part 3: Unified speech and audio coding" , ISO/IEC FDIS 23003-3:2011(E); ISO/IEC JTC 1/SC 29/WG 11; STD Version 2.1c2 , 2011 , 286 pp.

Berisha, Visar , et al. , "A Scalable Bandwidth Extension Algorithm" , IEEE Int'l Conf. on Acoustics, Speech, and Signal Processing (ICASSP 2007): Honolulu, HI , pp. IV-601-IV-604.

Geiser, Bernd , et al. , "A Qualified ITU-T G.729EV Codec Candidate for Hierarchical Speech and Audio Coding" , IEEE 8th Workshop on Multimedia Signal Processing , pp. 114-118.

Geiser, Bernd , et al. , "Bandwidth Extension for Hierarchical Speech and Audio Coding in ITU-T Rec. G.729.1" , IEEE Transactions on Audio, Speech and Language Processing, IEEE Service Center, vol. 15, No. 8 , pp. 2496-2509.

Lei, Miao , et al., "G.722-SWB: Proposed draft specification for the superwideband embedded extension for ITU-T G.722" , Proposed Draft; Study Group 16—Contribution 463; Huawei Technologies, ETRI, France Telecom Orange, NTT , 89 pages.

Neuendorf, Max , et al. , "MPEG Unified Speech and Audio Coding—The ISO/MPEG Standard for High-Efficiency Audio Coding of all Content Types" , Audio Engineering Society Convention Paper 8654, Presented at the 132nd Convention , pp. 1-22.

Tammi, Mikko , et al. , "Scalable Superwideband Extension for Wideband Coding" , IEEE Int'l Conf. on Acoustics, Speech, and Signal Processing (ICASSP 2009); Taipei, Taiwan , pp. 161-164.

Unno, Takahiro , et al. , "A Robust Narrowband to Wideband Extension System Featuring Enhanced Codebook Mapping" , IEEE Int'l Conf. on Acoustics, Speech, and Signal Processing (ICASSP 2005), Philadelphia, PA , pp. I-805-I-808.

* cited by examiner

CONCEPT FOR CODING MODE SWITCHING COMPENSATION

CROSS-REFERENCE TO RELATED APPLICATION

This application is a continuation of copending U.S. patent application Ser. No. 16/915,904, filed Jun. 29, 2020, which in turn is a continuation of copending U.S. patent application Ser. No. 15/873,550, filed 17 Jan. 2018, which is a continuation of copending U.S. patent application Ser. No. 14/812,263, filed Jul. 29, 2015, which in turn is a continuation of International Application No. PCT/EP2014/051565, filed Jan. 28, 2014, which claims priority from U.S. Provisional Application No. 61/758,086, filed Jan. 29, 2013, which are each incorporated herein in its entirety by this reference thereto.

BACKGROUND OF THE INVENTION

The present application is concerned with information signal coding using different coding modes differing, for example, in effective coded bandwidth and/or energy preserving property.

In [1], [2] and [3] it is proposed to deal with short restrictions of bandwidth by extrapolating the missing content with a blind BWE in a predictive manner. However, this approach does not cover cases, in which the bandwidth changes on a long-term basis. Also, there is no consideration of different energy preserving properties (e.g. blind BWEs usually have significant energy attenuations at high frequencies compared to a full-band core). Codecs using modes of varying bandwidth are described in [4] and [5].

In mobile communication applications, variations of the available data rate that also affect the bitrate of the used codec might not be unusual. Hence, it would be favorable to be able to switch the codec between different, bitrate dependent settings and/or enhancements. When switching between different BWEs and e.g. a full-band core is intended, discontinuities might occur due to different effective output bandwidths or varying energy preserving properties. More precisely, different BWEs or BWE settings might be used dependent on operating point and bitrate (see FIG. 1): Typically, for very low bitrates a blind bandwidth extension scheme is of advantage, to focus the available bitrate at the more important core-coder. The blind bandwidth extension typically synthesizes a small extra bandwidth on top of the core-coder without any additional side-information. To avoid the introduction of artifacts (e.g. by energy overshoots or amplification of misplaced components) by the blind BWE, the extra bandwidth is usually very limited in energy. For medium bitrates, it is in general advisable to replace the blind BWE by a guided BWE approach. This guided approach uses parametric side-information for energy and shape of the synthesized extra bandwidth. By this approach and compared to the blind BWE, a wider bandwidth at higher energy can be synthesized. For high bitrates, it is advisable to code the complete bandwidth in the core-coder domain, i.e. without bandwidth extension. This typically provides a near perfect preservation of bandwidth and energy.

Accordingly, it is an object of the present invention to provide a concept for improving the quality of codecs supporting switching between different coding modes, especially at the transitions between the different coding modes.

SUMMARY

An embodiment may have a decoder supporting, and being switchable between, at least two modes so as to decode an information signal, wherein the decoder is configured to, in a first of the at least two modes, decode the information signal within a first bandwidth in a first manner, and in a second of the at least two modes, decode the information signal within a second bandwidth, which is equal to or different from the first bandwidth, in a second manner which is different from the first manner, responsive to a switching instance of at least one of from the first mode to the second mode and from the second mode to the first mode, perform temporal smoothing and/or blending at a transition between a first temporal portion of the information signal, preceding the switching instance, and a second temporal portion of the information signal, succeeding the switching instance, in a manner confined to a high-frequency spectral band which overlaps the first bandwidth and the second bandwidth.

According to another embodiment, a method for decoding supporting, and being switchable between, at least two modes so as to decode an information signal, may have the steps of: in a first of the at least two modes, decoding the information signal within a first bandwidth in a first manner, and in a second of the at least two modes, decoding the information signal within a second bandwidth, which is equal to or different from the first bandwidth, in a second manner which is different from the first manner, responsive to a switching instance of at least one of from the first mode to the second mode and from the second mode to the first mode, performing temporal smoothing and/or blending at a transition between a first temporal portion of the information signal, preceding the switching instance, and a second temporal portion of the information signal, succeeding the switching instance, in a manner confined to a high-frequency spectral band which overlaps the first bandwidth and the second bandwidth.

Another embodiment may have a non-transitory digital storage medium having a computer program stored thereon to perform the method for decoding when said computer program is run by a computer.

It is a finding on which the present application is based that a codec allowing for switching between different coding modes may be improved by, responsive to a switching instance, performing temporal smoothing and/or blending at a respective transition.

In accordance with an embodiment, the switching takes place between a full-bandwidth audio coding mode on the one hand and a BWE or sub-bandwidth audio coding mode, on the other hand. According to a further embodiment, additionally or alternatively temporal smoothing and/or blending is performed at switching instances switching between guided BWE and blind BWE coding modes.

Beyond the above outlined finding, according to a further aspect of the present application, the inventors of the present application realized that the temporal smoothing and/or blending may be used for multimode coding improvement also at switching instances between coding modes, the effective coded bandwidth of which actually both overlap with a high-frequency spectral band within which the temporal smoothing and/or blending is spectrally performed. To be more precise, in accordance with an embodiment of the present application, the high-frequency spectral band within which the temporal smoothing and/or blending at transitions is performed, spectrally overlaps with the effective coded bandwidth of both coding modes between which the switching at the switching instance takes place. For example, the high-frequency spectral band may overlap the bandwidth extension portion of one of the two coding modes, i.e. that high-frequency portion into which, according to one of the two coding modes, the spectrum is extended using BWE. As far as the other of the two coding modes is concerned, the high-frequency spectral band may, for example, overlap a transform spectrum or a linearly predictively-coded spectrum or a bandwidth extension portion of this coding mode. The resulting improvement therefore stems from the fact that different coding modes may, even at spectral portions where their effective coded bandwidths overlap, have different energy preserving properties so that when coding an information signal, artificial temporal edges/jumps may result in the information signal's spectrogram. The temporal smoothing and/or blending reduces the negative effects.

In accordance with an embodiment of the present application, the temporal smoothing and/or blending is performed additionally depending on an analysis of the information signal in an analysis spectral band arranged spectrally below the high-frequency spectral band. By this measure, it is feasible to suppress, or adapt a degree of, temporal smoothing and/or blending, dependent on a measure of the information signal's energy fluctuation in the analysis spectral band. If the fluctuation is high, smoothing and/or blending may unintentionally, or disadvantageously, remove energy fluctuations in the high-frequency spectral band of the original signal, thereby potentially leading to a degradation of the information signal's quality.

Although the embodiment further outlined below are directed to audio coding, it should be clear that the present invention is also advantageous, and may also be advantageously be used, with respect to other kinds of information signals, such as measurement signals, data transmission signals or the like. All embodiments shall, accordingly, also be treated as presenting an embodiment for such other kinds of information signals.

BRIEF DESCRIPTION OF THE DRAWINGS

Embodiments of the present application are described further below with respect to the figures, among which FIG. 1 schematically shows, using a spectrotemporal grayscale distribution, exemplary BWEs and full-band core with different effective bandwidths and energy preserving properties.

DETAILED DESCRIPTION OF THE INVENTION

Figure 1:
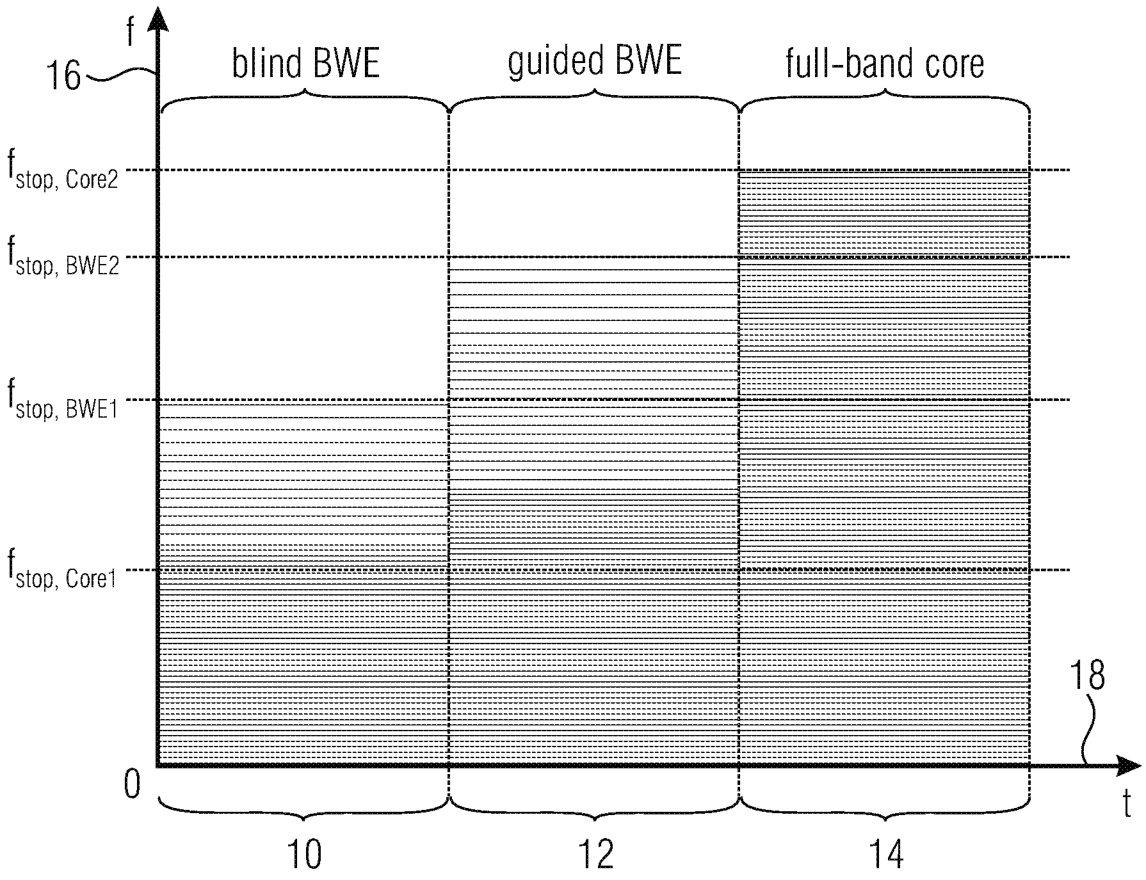

Before describing embodiments of the present application further below, reference is briefly made again to FIG. 1 in order to motivate and clarify the teaching and thoughts underlying the following embodiments. FIG. 1 shows exemplarily a portion out of an audio signal which is exemplarily consecutively coded using three different coding modes, namely blind BWE in a first temporal portion 10, guided BWE in a second temporal portion 12 and full-band core coding in a third temporal portion 14. In particular, FIG. 1 shows a two-dimensional grey-scale coded representation showing the variation of the energy preserving property with which the audio signal is coded, spectrotemporally, i.e. by adding a spectral axis 16 to the temporal axis 18. The details shown and described with respect to the three different coding modes shown in FIG. 1 shall be treated merely as being illustrative for the following embodiments, but these details alleviate the understanding of the following embodiments and their the advantages resulting therefrom, so that these details are described hereinafter.

Figure 2:
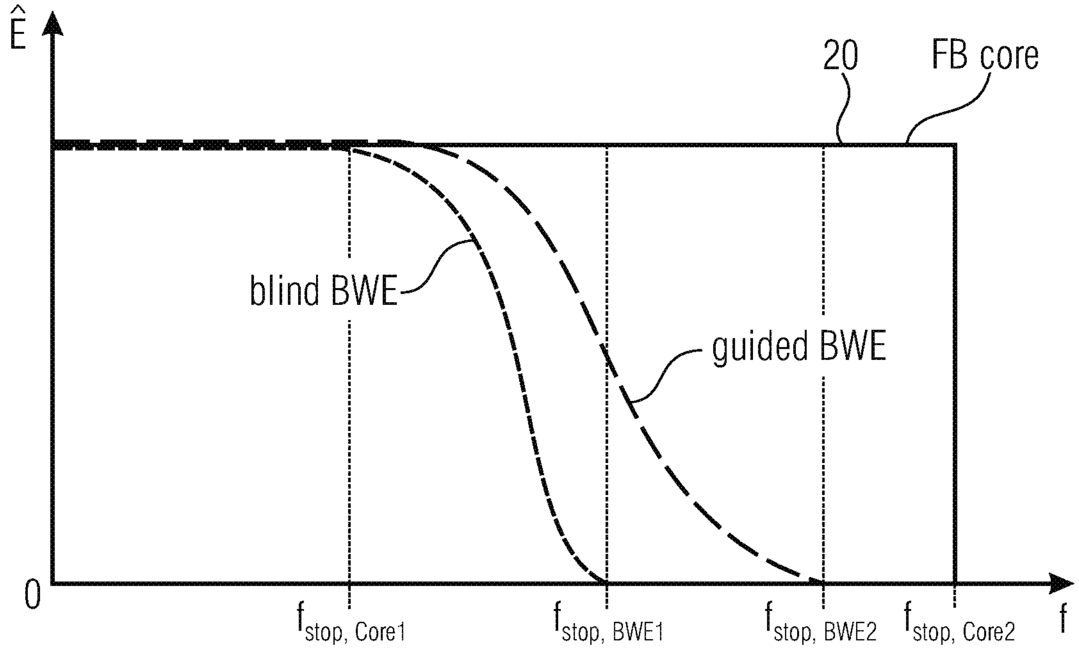
FIG. 2 shows schematically a graph showing an example for the difference in spectral cores of energy preserving property of the different coding modes of FIG. 1.

In particular, as shown by use of the grey scale representation of FIG. 1, the full-band core coding mode, substantially preserves the audio signal's energy over the full bandwidth extending from 0 to $f_{stop,Core2}$. In FIG. 2, the spectral course of the full-band core's energy preserving property E is graphically shown over frequency f at 20. Here, transform coding is exemplarily used with the transform interval continuously extending from 0 to $f_{stop,Core2}$. For example, according to mode 20, a critically sampling lapped transform may be used to decompose the audio signal with then coding the spectral lines resulting therefrom using, for example, quantization and entropy coding. Alternatively, the full-band core mode may be of the linear predictive type such as CELP or ACELP.

The two BWE coding modes exemplarily illustrated in FIGS. 1 and 2 also code a low-frequency portion using a core coding mode such as the just outlined transform coding mode or linear predictive coding mode, but this time the core coding merely relates to a low-frequency portion of the full bandwidth which ranges from 0 to $f_{stop,Core1}<f_{stop,Core2}$. The audio signal's spectral components above $f_{stop,Core1}$ are parametrically coded in case of guided bandwidth extension up to a frequency $f_{stop,BWE2}$, and without side information in the data stream, i.e. blindly, in case of blind of bandwidth extension mode between $f_{stop,Core1}$ and $f_{stop,BWE1}$ wherein in case of FIG. 2, $f_{stop,Core1}<f_{stop,BWE1}<f_{stop,BWE2}<f_{stop,Core2}$.

According to blind bandwidth extension, for example, a decoder estimates in accordance with that blind BWE coding mode, the bandwidth extension portion $f_{stop,Core1}$ to $f_{stop,BWE1}$ from the core coding portion extending from 0 to $f_{stop,Core1}$ without any additional side information contained in the data stream in addition to the coding of the core coding's portion of the audio signal spectrum. Owing to the non-guided way in that the audio signal's spectrum coded up to the core coding stop frequency $f_{stop,Core1}$, the width of the bandwidth extension portion of blind BWE is usually, but not necessarily smaller than the width of the bandwidth extension portion of the guided BWE mode which extends from $f_{stop,Core1}$ to $f_{stop,BWE2}$. In guided BWE, the audio signal is coded using the core coding mode as far as the spectral core coding portion extending from 0 to $f_{stop,Core1}$ is concerned, but additional parametric side information data is provided so as to enable the decoding side to estimate the audio signal spectrum beyond the crossover frequency $f_{stop,Core1}$ within the bandwidth extension portion extending from $f_{stop,Core1}$ to $f_{stop,BWE2}$. For example, this parametric side information comprises envelope data describing the audio signal's envelope in a spectrotemporal resolution which is coarser than the spectrotemporal resolution in which, when using transform coding, the audio signal is coded in the core coding portion using the core coding. For example, the decoder may replicate the spectrum within the core coding portion so as to preliminarily fill the empty audio signal's portion between $f_{stop,Core1}$ and $f_{stop,BWE2}$ with then shaping this pre-filled state using the transmitted envelope data.

FIGS. 1 and 2 reveal that switching between the exemplary coding modes may cause unpleasant, i.e. perceivable, artifacts at the switching instances between those coding modes. For example, when switching between guided BWE on the one hand and full-bandwidth coding mode on the other hand, it is clear that while the full-bandwidth coding mode correctly reconstructs, i.e. effectively codes, the spectral components within spectral portion $f_{stop,BWE2}$ and $f_{stop,Core2}$, the guided BWE mode is not even able to code anything of the audio signal within that spectral portion. Accordingly, switching from guided BWE to FB coding may cause a disadvantageous, sudden onset of spectral components of the audio signal within that spectral portion, and switching in the opposite direction, i.e. from FB core coding to guided BWE, may in turn cause a sudden vanishing of such spectral components. This may, however, cause artifacts in the reproduction of the audio signal. The spectral area where, compared to the full bandwidth core coding mode, nothing of the original audio signal's energy is preserved, is even increased in case of blind BWE and accordingly, the spectral area of sudden onset and/or sudden vanishing just described with respect to guided BWE also occurs with blind BWE and switching between that mode and FB core coding mode, with the spectral portion, however, being increased and extending from $f_{stop,BWE1}$ to $f_{stop,Core2}$.

However, the spectral portions where annoying artifacts may result from switching between different coding modes is not restricted to those spectral portions where one of the coding modes between which a switching instance takes place is completely bare of coding anything, i.e. is not restricted to spectral portions outside one's of the coding modes effective coding bandwidth. Rather, as is shown in FIGS. 1 and 2, there are even portions where actually both coding modes between which the switching instance takes place are actually effective, but where the energy preserving property of these coding modes differs in such a way that annoying artifacts may also result therefrom. For example, in case of switching between FB core coding and guided BWE, both coding modes are effective within spectral portion $f_{stop,Core1}$ and $f_{stop,BWE2}$, but while the FB core coding mode 20 substantially conserves the audio signal's energy within that spectral portion, the energy preserving property of guided BWE within that spectral portion is substantially decreased, and accordingly the sudden decrease/increase when switching between these two coding modes may also cause perceivable artifacts.

The above outlined switching scenarios are merely meant to be representative. There are other pairs of coding modes, the switching between which causes, or may cause, annoying artifacts. This is true, for example, for a switching between blind BWE on the one hand and guided BWE on the other hand, or switching between any of blind BWE, guided BWE and FB coding on the one hand and the mere co-coding underlying blind BWE and guided BWE on the other hand or even between different full-band core coders with unequal energy preserving properties.

The embodiments outlined further below overcome the negative effects resulting from the above outlined circumstances when switching between different coding modes.

Figure 3:
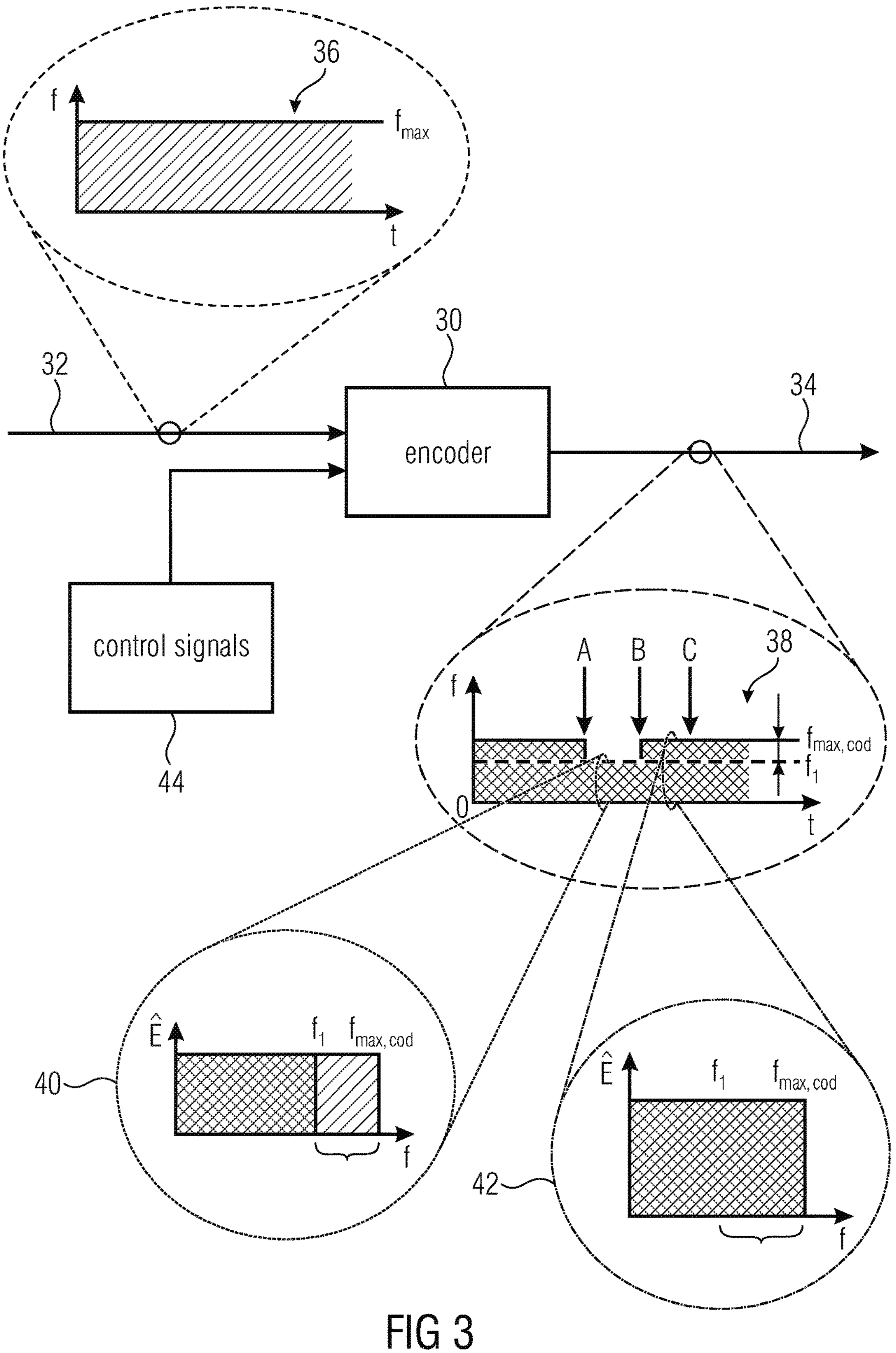
FIG. 3 shows schematically an encoder supporting different coding modes in connection with which embodiments of the present application may be used.

Before describing these embodiments, however, it is briefly explained with respect to FIG. 3, which shows an exemplary encoder supporting different coding modes, how the encoder may, for example, decide on the currently used coding mode among the several coding modes supported in order to better understand why the switching therebetween may result in the above-outlined perceivable artifacts.

The encoder shown in FIG. 3 is generally indicated using reference sign 30, which receives an information signal, i.e. here an audio signal, 32 at its input and outputs a data stream 34 representing/coding the audio signal 32, at its output. As just outlined, the encoder 30 supports a plurality of coding modes of different energy preserving property as exemplarily outlined with respect to FIGS. 1 and 2. The audio signal 32 may be thought of as being undistorted, such as having a represented bandwidth from 0 up to some maximum frequency such as half the sampling rate of the audio signal 32. The original audio signal's spectrum or spectrogram is shown in FIG. 3 at 36. The audio encoder 30 switches, during encoding the audio signal 32, between different coding modes such as the ones outlined above with respect to FIGS. 1 and 2, into data stream 34. Accordingly, the audio signal is reconstructible from data stream 34, however, with the energy preservation in the higher frequency region varying in accordance with the switching between the different coding modes. See, for example, the audio signal's spectrum/spectrogram as reconstructible from data stream 34 in FIG. 3 at 38, wherein three switching instances A, B and C are exemplarily shown. In front of switching A, the encoder 30 uses a coding mode which encodes the audio signal 32 up to some maximum frequency $f_{max,cod} \le f_{max}$ with substantially, for example, preserving the energy across the complete bandwidth 0 to $f_{max,cod}$. Between switching instances A and B, for example, the encoder 30 uses a coding mode which, as shown in 40, has an effective coded bandwidth which merely extends up to frequency $f_1<f_{max,cod}$ with, for example, substantially constant energy preserving property across this bandwidth, and between switching instances B and C, encoder 30 uses exemplarily a coding mode which also has an effective coded bandwidth extending up to $f_{max,cod}$, but with reduced energy preserving property relative to the full-bandwidth coding mode prior to instance A as far as the spectral range between $f_1$ to $f_{max,cod}$, is concerned, as it is shown at 42.

Accordingly, at the switching instances, problems with respect to perceivable artifacts may occur as they were discussed above with respect to FIGS. 1 and 2. The encoder 30 may, however, despite the problems, decide to switch between the coding modes at switching instances A to C, responsive to external control signals 44. Such external control signals 44 may, for example, stem from a transmission system responsible for transmitting the data stream 34. For example, the control signals 44 may indicate to the encoder 30 an available transmission bandwidth so that the encoder 30 may have to adapt the bitrate of data stream 34 so as to meet, i.e. to be below or equal to, the available bitrate indicated. Depending on this available bitrate, however, the optimum coding mode among the available coding modes of encoder 30 may change. The "optimum coding mode" may be the one with the optimum/best rate to distortion ratio at the respective bitrate. As the available bitrate changes, however, in a manner completely or substantially uncorrelated with the content of the audio signal 32, these switching instances A to C may occur at times where the content of the audio signal has, disadvantageously, substantial energy within that high-frequency portion $f_1$ to $f_{max,cod}$, where owing to the switching between the coding modes, the energy preserving property of encoder 30 varies in time. Thus, the encoder 30 may not be able to help it, but may have to switch between the coding modes as dictated from outside by the control signals 44 even at times where switching is disadvantageous.

The embodiments described next concern embodiments for a decoder configured to appropriately reduce the negative effects resulting from the switching between coding modes at the encoder side.

Figure 4:
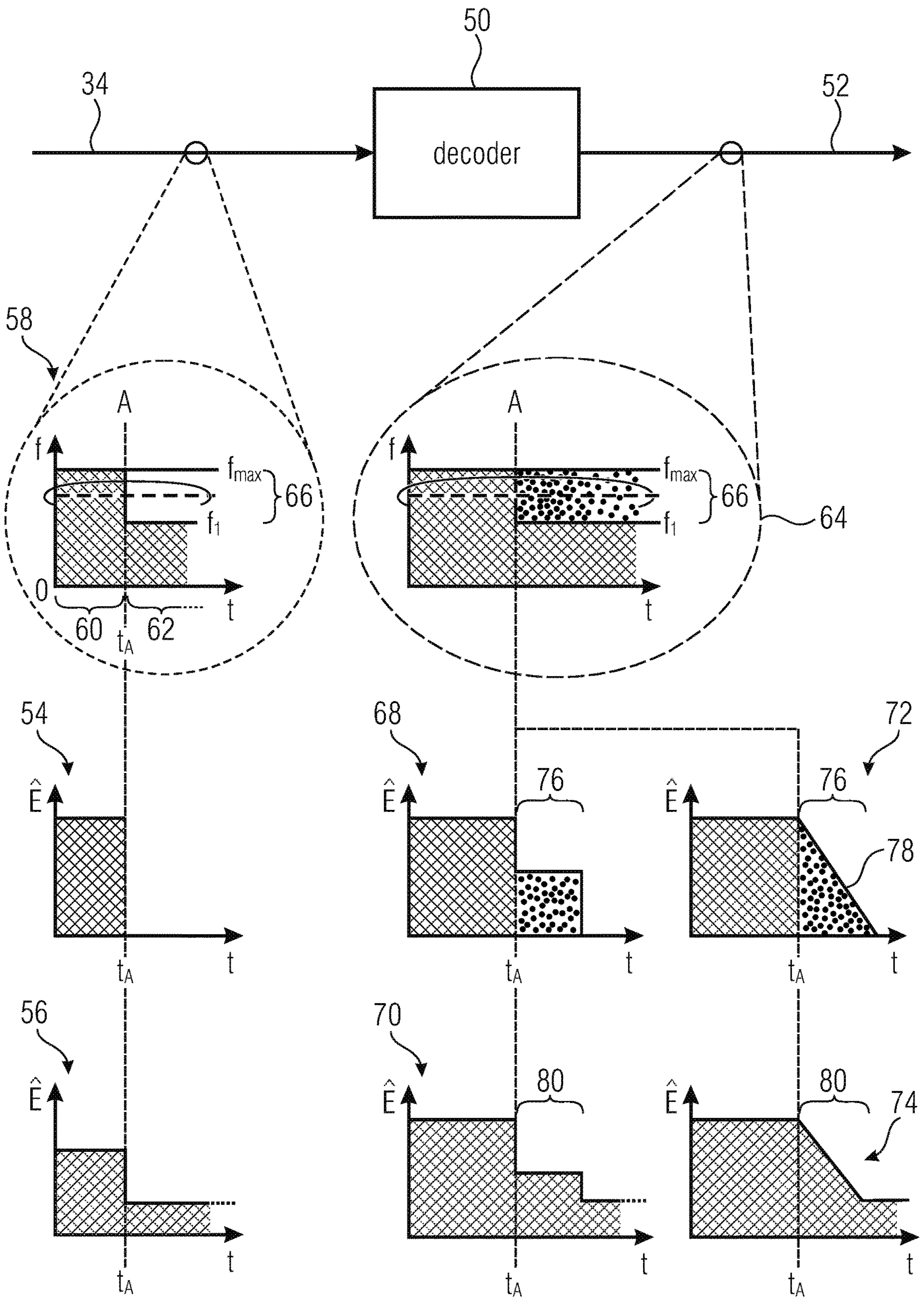
FIG. 4 schematically shows a decoder supporting different coding modes with additionally schematically illustrating exemplary functionalities when switching, in a high-frequency spectral band, from higher to lower energy preserving properties.

FIG. 4 shows a decoder 50 supporting, and being switchable between, at least two coding modes so as to decode an information signal 52 from an inbound data stream 34, wherein the decoder is configured to, responsive to certain switching instances, perform temporal smoothing or blending as described further below.

With respect to examples for coding modes supported by decoder 50, reference is made to the above description with respect to FIGS. 1 and 2, for example. That is, the decoder 50 may, for example, support one or more core coding modes using which an audio signal has been coded into data stream 34 up to a certain maximum frequency using transform coding, for example, with the data stream 34 comprising, for portions of the audio signal coded with such a core coding mode, a spectral line-wise representation of a transform of the audio signal, spectrally decomposing the audio signal from 0 up to the respective maximum frequency. Alternatively, the core coding mode may involve predictive coding such as linear prediction coding. In the first case, the data stream 34 may comprise for core coded portions of the audio signal, a coding of a spectral line-wise representation of the audio signal, and the decoder 50 is configured to perform an inverse transformation onto this spectral line-wise representation, with the inverse transformation resulting in an inverse transform extending from 0 frequency to the maximum frequency so that the audio signal 52 reconstructed substantially coincides, in energy, with the original audio signal having been encoded into data stream 34 over the whole frequency band from 0 to the respective maximum frequency. In case of a predictive core coding mode, the decoder 50 may be configured to use linear prediction coefficients contained in the data stream 30 for temporal portions of the original audio signal having been encoded into the data stream 34 using the respective predictive core coding mode, so as to, using a synthesis filter set according to the linear prediction coefficient, or using frequency domain noise shaping (FDNS) controlled via the linear prediction coefficients, reconstruct the audio signal 52 using an excitation signal also coded for these temporal portions. In case of using a synthesis filter, the synthesis filter may operate in a sample rate so that the audio signal 52 is reconstructed up to the respective maximum frequency, i.e. at two times the maximum frequency as sample rate, and in case of using frequency domain noise shaping, the decoder 50 may be configured to obtain an excitation signal from the data stream 34 and a transform domain, the form of a spectral line-wise representation, for example, with shaping this excitation signal using FDNS (Frequency Domain Noise Shaping) by use of the linear prediction coefficients and performing an inverse transformation onto the spectrally shaped version of the spectrum represented by the transformed coefficients, and representing, in turn, the excitation. One or two or more such core coding modes with different maximum frequency may be available or be supported by decoder 50. Other coding modes may use BWE in order to extend the bandwidth supported by any of the core coding modes beyond the respective maximum frequency, such as blind or guided BWE. Guided BWE may, for example, involve SBR (spectral band replication) according to which the decoder 50 obtains a fine structure of a bandwidth extension portion, extending a core coding bandwidth towards higher frequencies, from the audio signal as reconstructed from the core coding mode, with using parametric side information so as to shape the fine structure according to this parametric side information. Other guided BWE coding modes are feasible as well. In case of blind BWE, decoder 50 may reconstruct a bandwidth extension portion extending a core coding bandwidth beyond its maximum towards higher frequencies without any explicit side information regarding that bandwidth extension portion.

It is noted that the units at which the coding modes may change in time within the data stream may be "frames" of constant or even varying length. Whereever the term "frame" in the following occurs, it is thus meant to denote such a unit at which the coding mode varies in the bit stream, i.e. units between which the coding modes might vary and within which the coding mode does not vary. For example, for each frame, the data stream 34 may comprise a syntax element revealing the coding mode using which the respective frame is coded. Switching instances may thus be arranged at frame borders separating frames of different coding modes. Sometimes the term sub-frames may occur. Sub-frames may represent a temporal partitioning of frames into temporal sub-units at which the audio signal is, in accordance with the coding mode associated with the respective frame, coded using sub-frame specific coding parameters for the respective coding mode.

FIG. 4 especially concerns the switching from a coding mode having higher energy preserving property at some high-frequency spectral band, to a coding mode having less, or no, energy preserving property within that high-frequency spectral band. It is noted that FIG. 4 concentrates on these switching instances merely for ease of understanding and a decoder in accordance with an embodiment of the present application should not be restricted to this possibility. Rather, it should be clear that a decoder in accordance with embodiments of the present application could be implemented so as to incorporate all of, or any subset of, the specific functionalities described with respect to FIG. 4 and the following figures in connection with specific switching instances for specific coding mode pairs between which the respective switching instance taking place.

FIG. 4 exemplarily shows a switching instance A at time instance $t_A$ where the coding mode, using which the audio signal is coded into data stream 34, switches from a first coding mode to a second coding mode, wherein the first coding mode is exemplarily a coding mode having an effective coded bandwidth from 0 to $f_{max}$, to a coding mode coinciding in energy preserving property from 0 frequency up to a frequency $f_1<f_{max}$, but having smaller energy preserving property or no energy preserving property beyond that frequency, i.e. between $f_1$ to $f_{max}$. The two possibilities are exemplarily illustrated at 54 and 56 in FIG. 4 for an exemplary frequency between $f_1$ and $f_{max}$ indicated with a dashed line within the schematic spectrotemporal representation of the energy preserving property using which the audio signal is coded into data stream 34 at 58. In the case of 54, the second coding mode, the decoded version of the temporal portion of the audio signal 52, succeeding the switching instance A, has an effective coded bandwidth which merely extends up to $f_1$ so that the energy preserving property is 0 beyond this frequency as shown at 54.

For example, the first coding mode as well as the second coding mode may be core coding modes having different maximum frequencies $f_1$ and $f_{max}$. Alternatively, one or both of these coding modes may involve bandwidth extension with different effective coded bandwidths, one extending up to $f_1$ and the other to $f_{max}$.

The case of 56 illustrates the possibility of both coding modes having an effective coded bandwidth extending up to $f_{max}$, with the energy preserving property of the second coding mode, however, being decreased relative to the one of the first coding modes concerning the temporal portion preceding the time instance $t_A$.

The switching instance A, i.e. the fact that the temporal portion 60 immediately preceding the switching instance A, is coded using the first coding mode, and the temporal portion 62 immediately succeeding the switching instance A is coded using the second coding mode, may be signaled within the data stream 34, or may be otherwise signaled to the decoder 50 such that the switching instances at which decoder 50 changes the coding modes for decoding the audio signal 52 from data stream 34 is synchronized with the switching the respective coding modes at the encoding side. For example, the frame wise mode signaling briefly outlined above may be used by the decoder 50 so as to recognize and identify, or discriminate between different types of, switching instances.

In any case, the decoder of FIG. 4 is configured to perform temporal smoothing or blending at the transition between the decoded versions of the temporal portions 60 and 62 of the audio signal 52 as is schematically illustrated at 64 which seeks to illustrate the effect of performing the temporal smoothing or blending by showing that the energy preserving property within the high-frequency spectral band 66 between frequencies $f_1$ to $f_{max}$ is temporally smoothened so as to avoid the effects of the temporal discontinuity at the switching instance A.

Similar to 54 and 56, at 68, 70, 72 and 74, a non-exhaustive set of examples show how decoder 50 achieves the temporal smoothing/blending by showing the resulting energy preserving property course, plotted over time t, for an exemplary frequency indicated with dashed lines in 64 within the high-frequency spectral band 66. While examples 68 and 72 represent possible examples of the decoder's 50 functionality for dealing with a switching instance example shown in 54, the examples shown in 70 and 74 show possible functionalities of decoder 50 in case of a switching scenario illustrated at 56.

Again, in the switching scenario illustrated at 54, the second coding mode does not at all reconstruct the audio signal 52 above frequency $f_1$. In order to perform the temporal smoothing or blending at the transition between the decoded versions of the audio signal 52 before and after the switching instance A, in accordance with the example of 68, the decoder 50 temporarily, for a temporary time period 76 immediately succeeding the switching instance A, performs blind BWE so as to estimate and fill the audio signal's spectrum above frequency $f_1$ up to $f_{max}$. As shown in example 72, the decoder 50 may to this end subject the estimated spectrum within the high-frequency spectral band 66 to a temporal shaping using some fade-out function 78 so that the transition across switching instance A is even more smoothened as far as the energy preserving property within the high-frequency spectral band 66 is concerned.

A specific example for the case of the example 72 is described further below. It is emphasized that the data stream 34 does not need to signal anything concerning the temporary blind BWE performance within data stream 34. Rather, the decoder 50 itself is configured to be responsive to the switching instance A so as to temporarily apply the blind BWE—with or without fade-out.

The extension of the effective coded bandwidth of one of the coding modes adjoining each other across the switching instance beyond its upper bound towards higher frequencies using blind BWE is called temporal blending in the following. As will become clear from the description of FIG. 5, it would be feasible to temporally displace/shift the blending period 76 across the switching instance so as to start even earlier than the actual switching instance. As far as the portion of the blending time period 76 is concerned, which would precede the switching instance A, the blending would result in reducing the audio signal's 52 energy within the high-frequency spectral band 66 in a gradual manner, i.e. by a factor between 0 and 1, both exclusively, or in a varying manner varying in an interval or subinterval between 0 and 1, so as to result in the temporal smoothing of the energy preserving property within the high-frequency spectral band 66.

The situation of 56 differs from the situation in 54 in that the energy preserving property of both coding modes adjoining each other across the switching instance A is, in case of 56, unequal to 0 within the high-frequency spectral band 66 in both coding modes. In the case of 56, the energy preserving property suddenly falls at the switching instance A. In order to compensate for potential negative effects of this sudden reduction in energy preserving property in band 66, decoder 50 of FIG. 4 is, in accordance with the example of 70, configured to perform temporal smoothing or blending at the transition between the temporal portions 60 and 62 immediately preceding and succeeding the switching instance A by preliminarily, for a preliminary time period 80, immediately following the switching instance A, setting the audio signal's 52 energy within the high-frequency spectral band 66 so as to be between the energy of the audio signal 52 immediately preceding the switching instance A and the energy of the audio signal within the high-frequency spectral band 66 as solely obtained using the second coding mode. In other words, the decoder 50, during the preliminary time period 80, preliminarily increases the audio signal's 52 energy so as to preliminarily render the energy preserving property after the switching instance A more similar to the energy preserving property of the coding mode applied immediately preceding the switching instance A. While the factor used for this increase may be kept constant during the preliminary time period 80 as illustrated at 70, it is illustrated at 74 in FIG. 4 that this factor may also be gradually decreased within that time period 80, so as to obtain an even smoother transition of the energy preserving property across switching instance A within the high-frequency spectral band 64.

Later on, an example for the alternative shown/illustrated in 70 will be further outlined below. The preliminary change of the audio signal's level, i.e. increase in case of 70 and 74, so as to compensate for the increased/reduced energy preserving property with which the audio signal is encoded before and after the respective switching instance A, is called temporal smoothing in the following. In other words, temporal smoothing within the high-frequency spectral band during the preliminary time period 80, shall denote an increase of the audio signal's 52 level/energy at the temporal portion around the switching instance A where the audio signal is coded using the coding mode having weaker energy preserving property within that high-frequency spectral band relative to the audio signal's 52 level/energy directly resulting from the decoding using the respective coding mode, and/or a decrease of the audio signal's 52 level/energy during the temporary period 80 within a temporal portion around the switching instance A where the audio signal is coded using the coding mode having higher energy preserving property within the high-frequency spectral band, relative to the energy directly resulting from encoding the audio signal with that coding mode. In other words, the way the decoder treats switching instances like 56 is not restricted to placing the temporary period 80 so as to directly following the switching instance A. Rather, the temporary period 80 may cross the switching instance A or may even precede it. In that case, the audio signal's 52 energy is, during the temporary period 80, as far as the temporal portion preceding the switching instance A is concerned, decreased in order to render the resulting energy preserving property more similar to the energy preserving property of the coding mode with which the audio signal is coded subsequent to the switching instance A, i.e. so that the resulting energy preserving property within the high-frequency spectral band lies between the energy preserving property of the coding mode before switching instance A and the energy preserving property of the coding mode subsequent to the switching instant A, both within high-frequency spectral band 66.

Figure 5:
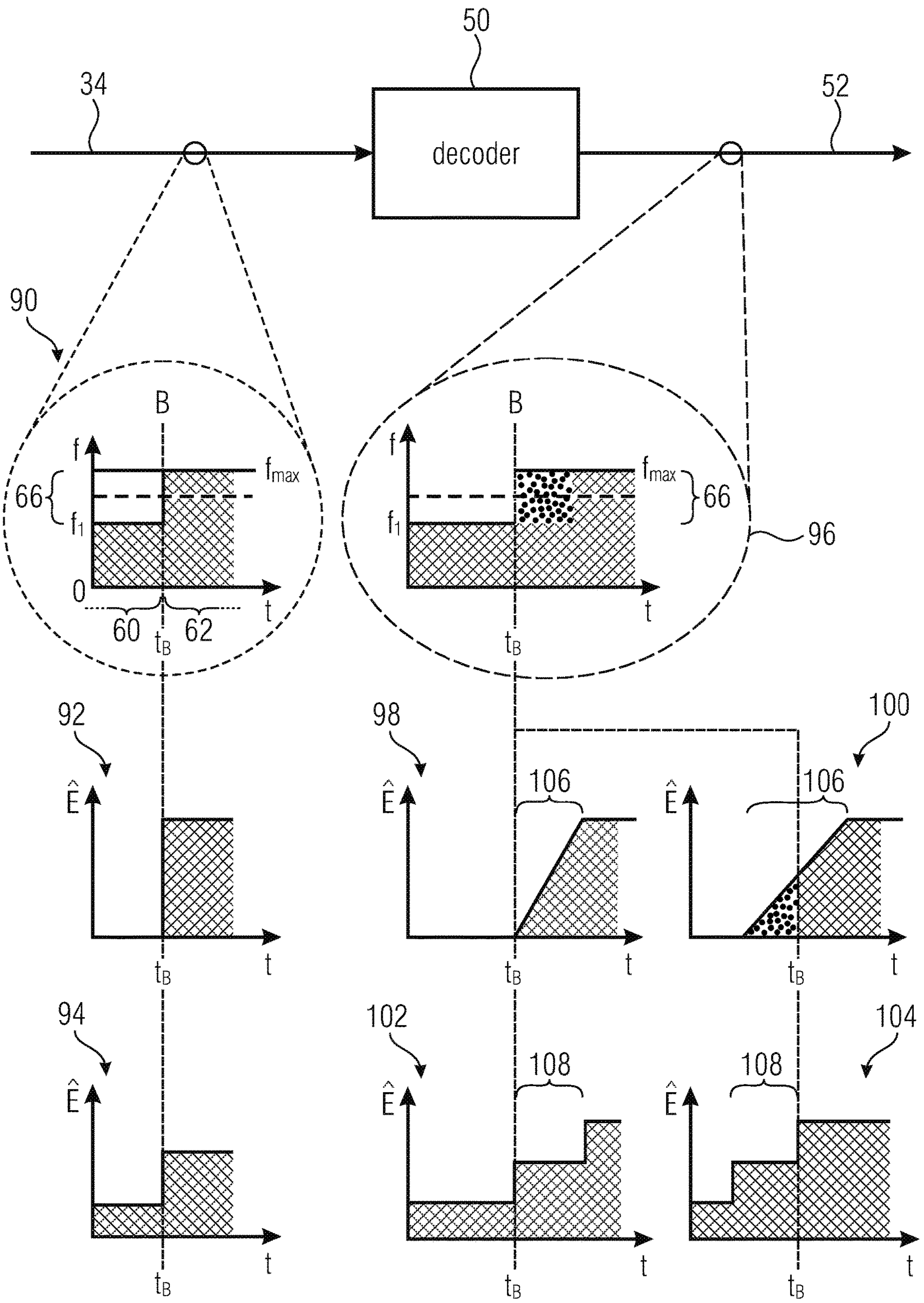
FIG. 5 schematically shows a decoder supporting different coding modes with additionally schematically illustrating exemplary functionalities when switching, in a high-frequency spectral band, from lower to higher energy preserving properties.

Before proceeding with the description of the decoder of FIG. 5, it is noted that the concepts of temporal smoothing and temporal blending may be mixed: Imagine, for example, that blind BWE is used as a basis for performing temporal blending. This blind BWE may have, for example, a lower energy preserving property, which "defect" may additionally compensated for by additionally applying temporal smoothing thereinafter. Further, FIG. 4 shall be understood as describing embodiments for decoders incorporating/featuring one of the functionalities outlined above with respect to 68 to 74 or a combination thereof, namely responsive to respective instances 55 and/or 56. The same applies to the following figure which describes a decoder 50 which is responsive to switching instances from a coding mode having lower energy preserving property within a high-frequency spectral band 66 relative to the coding mode valid after the switching instance. In order to highlight the difference, the switching instance is denoted B in FIG. 5. Where possible, the same reference signs as used in FIG. 4 are reused in order to avoid an unnecessary repetition of the description.

In FIG. 5, the energy preserving property at which the audio signal is coded into stream 34 is plotted spectrotemporally in a schematic manner as it was the case in 58 in FIG. 4, and as it is shown, the temporal portion 60 immediately preceding the switching instance B belongs to a coding mode having decreased energy preserving property within the high-frequency spectral band relative to the coding mode selected immediately after the switching instance B so as to code the temporal portion 62 of the audio signal switching the instance B. Again, at 92 and 94 at FIG. 5, exemplary cases for the temporal course of the energy preserving property across the switching instance B at time instance $t_B$ are shown: 92 shows the case where the coding mode for temporal portion 60 has associated therewith an effective coded bandwidth which does not even cover the high-frequency spectral band 66 and accordingly has an energy preserving property of 0, whereas 94 shows the case where the coding mode for temporal portion 60 has an effective coded bandwidth which covers the high-frequency spectral band 66 and has a non-zero energy preserving property within the high-frequency spectral band, but reduced relative to the energy preserving property at the same frequency of the coding mode associated with the temporal portion 62 subsequent to the switching instance B.

The decoder of FIG. 5 is responsive to the switching instance B so as to somehow temporally smoothen the effective energy preserving property across the switching instance B as far as the high-frequency spectral band 66 is concerned, as illustrated in FIG. 5. Like FIG. 4, FIG. 5 presents four examples at 98, 100, 102 and 104 as to how the functionality of decoder 50 responsive to the switching instance B could be, but it is again noted that other examples are feasible as well as will be outlined in more detail below.

Among examples 98 to 104, examples 98 and 100 refer to the switching instance type 92, while the others refer to the switching instance type 94. Like graphs 92 and 94, the graphs shown at 98 to 104 show the temporal course of the energy preserving property for an exemplary frequency line in the inner of the high-frequency spectral band 66. However, 92 and 94 show the original energy preserving property as defined by the respective coding modes preceding and succeeding the switching instance B, while the graphs shown at 98 to 104 show the effective energy preserving property including, i.e. taking into account, the decoder's 50 measures performed responsive to the switching instance as described below. 98 shows an example where the decoder 50 is configured to perform a temporal blending upon realizing switching instance B: as the energy preserving property of the coding mode valid up to the switching instance B is 0, the decoder 50 preliminarily, for a temporary period 106, decreases the energy/level of the decoded version of the audio signal 52 immediately subsequent to the switching instance B as resulting from decoding using the respective coding mode valid from switching instance B on, so that within that temporary period 106 the effective energy preserving property lies somewhere between the energy preserving property of the coding mode preceding the switching instance B, and the unmodified/original energy preserving property of the coding mode succeeding the switching instance B, as far as the high-frequency spectral band 66 is concerned. The example 68 uses an alternative according to which a fade-in function is used to gradually/continuously increase the factor by which the audio signal's 52 energy is scaled during the temporary time period 106 from the switching instance B to the end of period 106. As explained above, however, with respect to FIG. 4 using examples 72 and 68, it would however also be feasible to leave the scaling factor during the temporary period 106 constant, thereby reducing, temporarily, the audio signal's energy during period 106 so as to get the resulting energy preserving property within band 66 closer to the 0 preserving property of the coding mode preceding switching instance B.

100 shows an example for an alternative of decoder's 50 functionality upon realizing switching instance B, which was already discussed with respect to FIG. 4 when describing 68 and 72: according to the alternative shown in 100, the temporary time period 106 is shifted along a temporal upstream direction so as to cross time instant $t_B$. The decoder 50, responsive to the switching instance B, somehow fills the empty, i.e. zero-energy valued, high-frequency spectral band 66 of the audio signal 52 immediately preceding the switching instance B using blind BWE, for example, in order to obtain an estimation of the audio signal 52 within band 66 within that part of portion 106 which temporally precedes the switching instance B, and then applies a fade-in function so as to gradually/continuously scale, from 0 to 1, for example, the audio signal's 52 energy from the beginning to the end of period 106, thereby continuously decreasing the degree of reducing the audio signal's energy within band 66 as obtained by blind BWE prior to the switching instance B, and using the coding mode selected/valid after the switching instance B as far as the portion's 106 part succeeding the switching instance B is concerned.

In case of switching between coding modes like in 94, the energy preserving property within band 66 is unequal to 0 both preceding as well as succeeding the switching instance B. The difference to the case shown at 56 in FIG. 4 is merely that the energy preserving property within band 66 is higher within the temporal portion 62 succeeding the switching instance B, compared to the energy preserving property of the coding mode applying within the temporal portion preceding the switching instance B. Effectively, the decoder 50 of FIG. 5 behaves, in accordance with the example shown at 102, similar to the case discussed above with respect to 70 and FIG. 4: the decoder 50 slightly scales down, during a temporary period 108 immediately succeeding the switching instance B, the audio signal's energy as decoded using the coding mode valid after the switching instance B, so as to set the effective energy preserving property to lie somewhere between the original energy preserving property of the coding mode valid prior to the switching instance B and the unmodified/original energy preserving property of the coding mode valid after the switching instance B. While a constant scaling factor is illustrated in FIG. 5 at 102, it has already been discussed in FIG. 4 with respect to the case 74 that a continuously temporarily changing fade-in function may be used as well.

For completeness, 104 shows an alternative according to which decoder 50 faces/shifts the temporary period 108 in a temporal upstream direction so as to immediately precede the switching instance B with accordingly increasing the audio signal's 52 energy during that period 108 using a scaling factor so as to set the resulting energy preserving property to lie somewhere between the original/unmodified energy preserving properties of the coding mode between which the switching instance B takes place. Even here, some fade-in scaling function may be used instead of a constant scaling factor.

Thus, examples 102 and 104 show two examples for performing temporal smoothing responsive to a switching instance B and just as it has been discussed with respect to FIG. 4, the fact that the temporary period may be shifted so as to cross, or even precede, the switching instance B may also be transferred onto the examples 70 and 74 of FIG. 4.

After having described FIG. 5, it is noted that the fact that a decoder 50 may incorporate merely one or a subset of the functionalities outlined above with respect to examples 98 to 104 responsive to switching instances 90 and/or 94, which statement has been provided, in a similar manner, with respect to FIG. 4. Is also valid as far as the overall set of functionalities 68, 70, 72, 74, 98, 100, 102 and 104 is concerned: a decoder may implement one or subset of the same responsive to switching instances 54, 56, 92 and/or 94.

FIGS. 4 and 5 commonly used $f_{max}$ to denote the maximum of the upper frequency limits of the effective coded bandwidths of the coding modes between which the switching instance A or B takes place, and $f_1$ to denote the uppermost frequency up to which both coding modes between which the switching instance takes place, have substantially the same—or comparable—energy preserving property so that below $f_1$ no temporal smoothing is necessary and the high-frequency spectral band is placed so as to have $f_1$ as a lower spectral bound, with $f_1 < f_{max}$. Although the coding modes have been discussed above briefly, reference is made to FIG. 6*a*-*d* to illustrate certain possibilities in more detail.

Figure 6A:
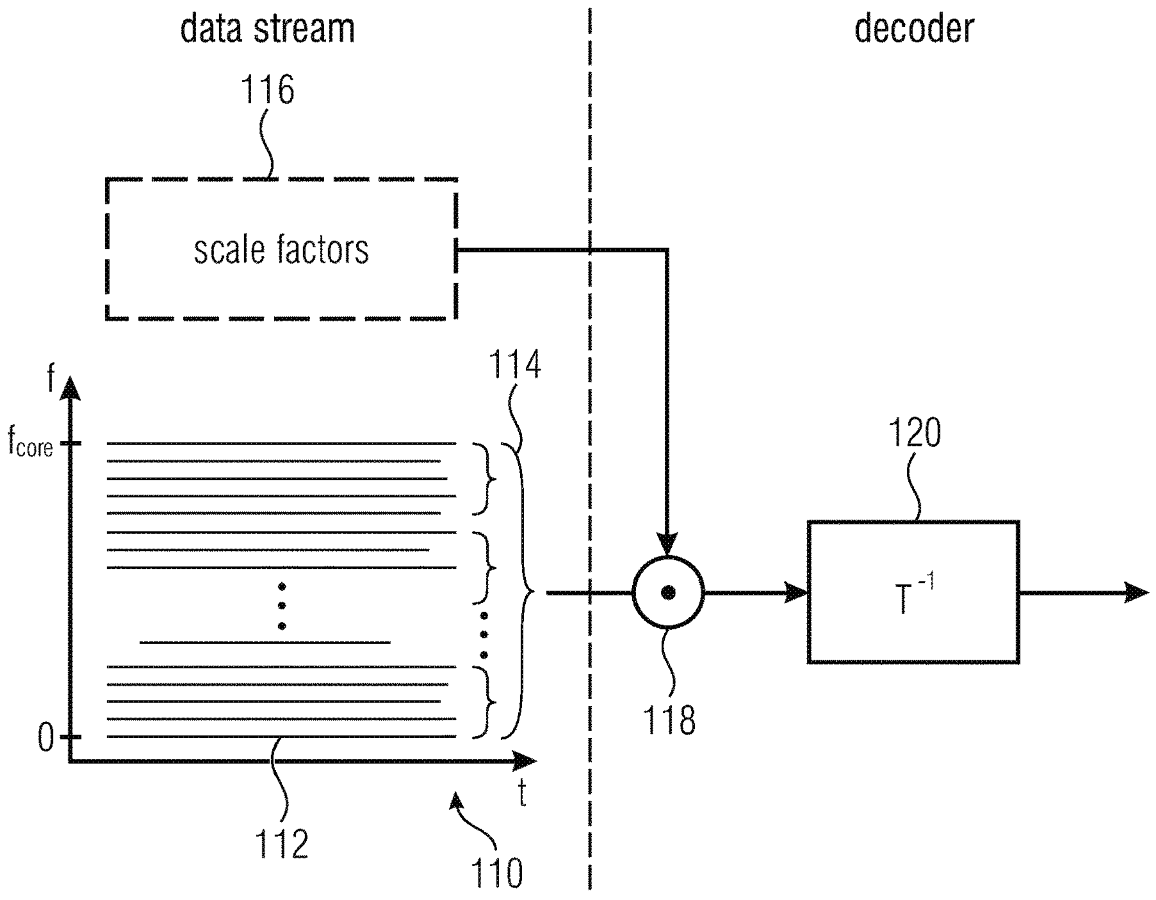
FIGS. 6*a*-6*d* schematically show different examples for coding modes, the data conveyed within the data stream for these coding modes, and functionalities within the decoder for handling the respective coding modes.

FIG. 6*a* shows a coding mode or decoding mode of decoder 50, representing one possibility of a "core coding mode". In accordance with this coding mode, an audio signal is coded into the data stream in the form of a spectral line-wise transform representation 110 such as a lapped transform having spectral lines 112 for 0 frequency up to a maximum frequency $f_{core}$ wherein the lapped transform may, for example, be an MDCT or the like. The spectral values of the spectral lines 112 may be transmitted differently quantized using scale factors. To this end, the spectral lines 112 may be grouped/partitioned into scale factor bands 114 and the data stream may comprise scale factors 116 associated with the scale factor bands 114. The decoder, in accordance with a mode of FIG. 6*a*, rescales the spectral values of the spectral lines 112 associated with the various scale factor bands 114 in accordance with the associated scale factors 116 at 118 and subjects the rescaled spectral line-wise representation to an inverse transformation 120 such as an inverse lapped transform such as an IMDCT—optionally including overlap/add processing for temporal aliasing compensation—so as to recover/reproduce the audio signal at the portion associated the coding mode of FIG. 6*a*.

Figure 6B:
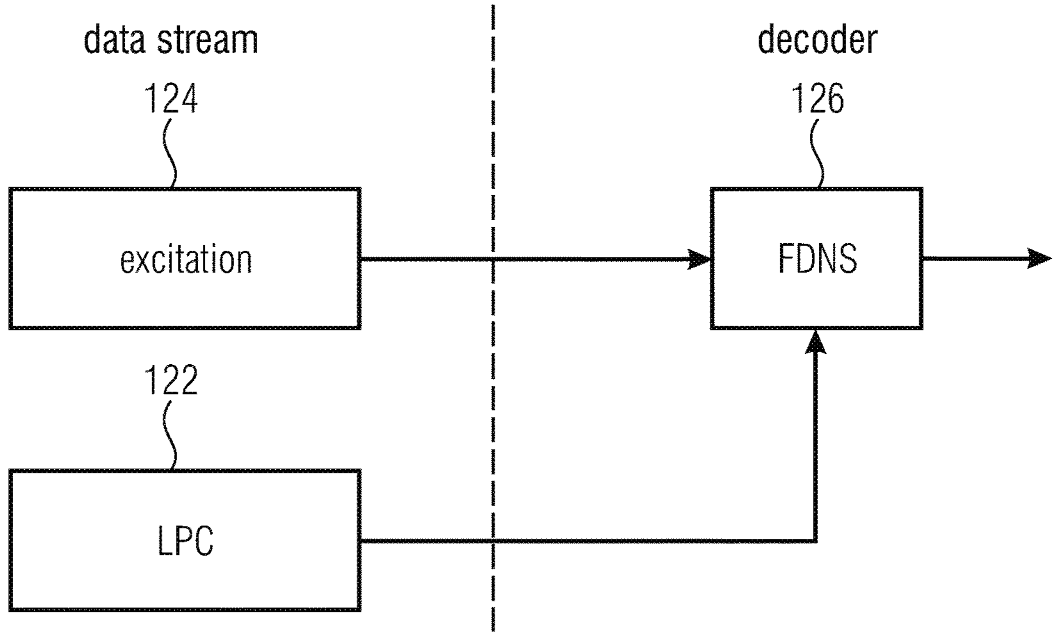

FIG. 6*b* illustrates a coding mode possibility which may also represent a core coding mode. The data stream comprises for portions coded with the coding mode associated with FIG. 6*b*, information 122 on linear prediction coefficients and information 124 on an excitation signal. Here, the information 124 represents the excitation signal using a spectral line-wise representation as the one shown at 110, i.e. using a spectral-line wise decomposition up to a highest frequency of $f_{core}$. The information 124 may also comprise scale factors, although not shown in FIG. 6*b*. In any case, the decoder subjects the excitation signal as obtained by the information 124 in the frequency domain to a spectral shaping, called frequency domain noise shaping 126, with the spectral shaping function derived on the basis of the linear prediction coefficients 122, thereby deriving the reproduction of the audio signal's spectrum which may then, for example, be subject to an inverse transformation just as it was explained with respect to 120.

Figure 6C:
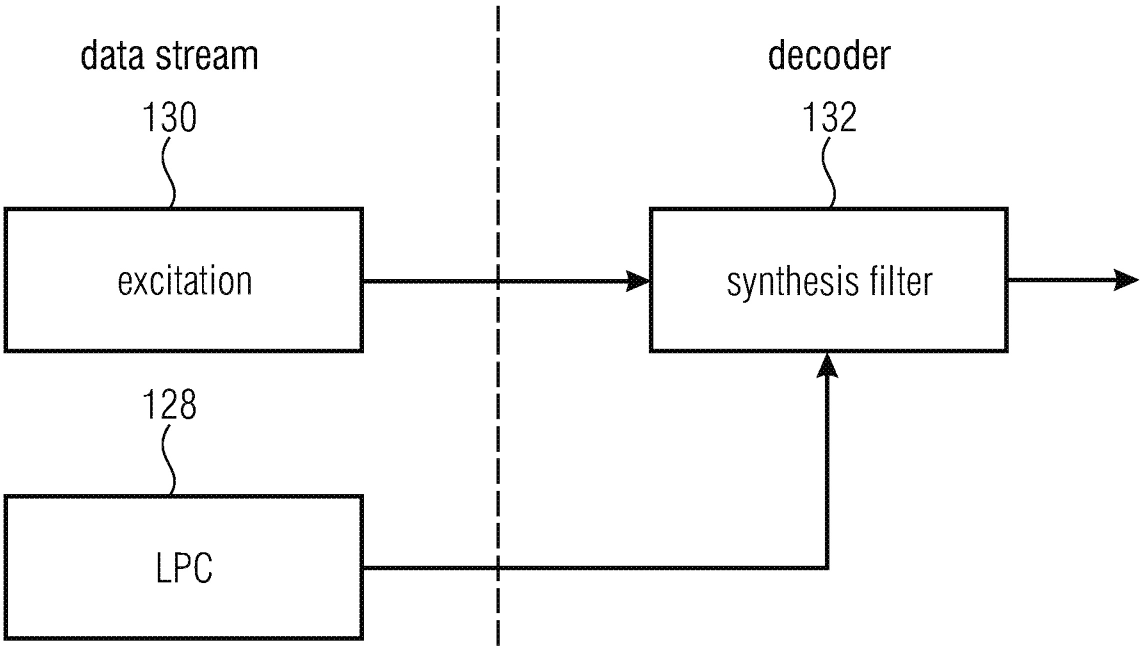

FIG. 6*c* also exemplifies a potential core coding mode. This time, the data stream comprises for respectively coded portions of the audio signal, information 128 of linear prediction coefficients and information on excitation signal, namely 130, wherein the decoder uses information 128 and 130 so as to subject the excitation signal 130 to a synthesis filter 138 adjusted according to the linear prediction coefficients 128. The synthesis filter 132 uses a certain sample filter-tap rate which determines, via the Nyquist criterion, a maximum frequency $f_{core}$ up to which the audio signal is reconstructed by use of the synthesis filter 132, i.e. at the output side thereof.

Figure 6D:
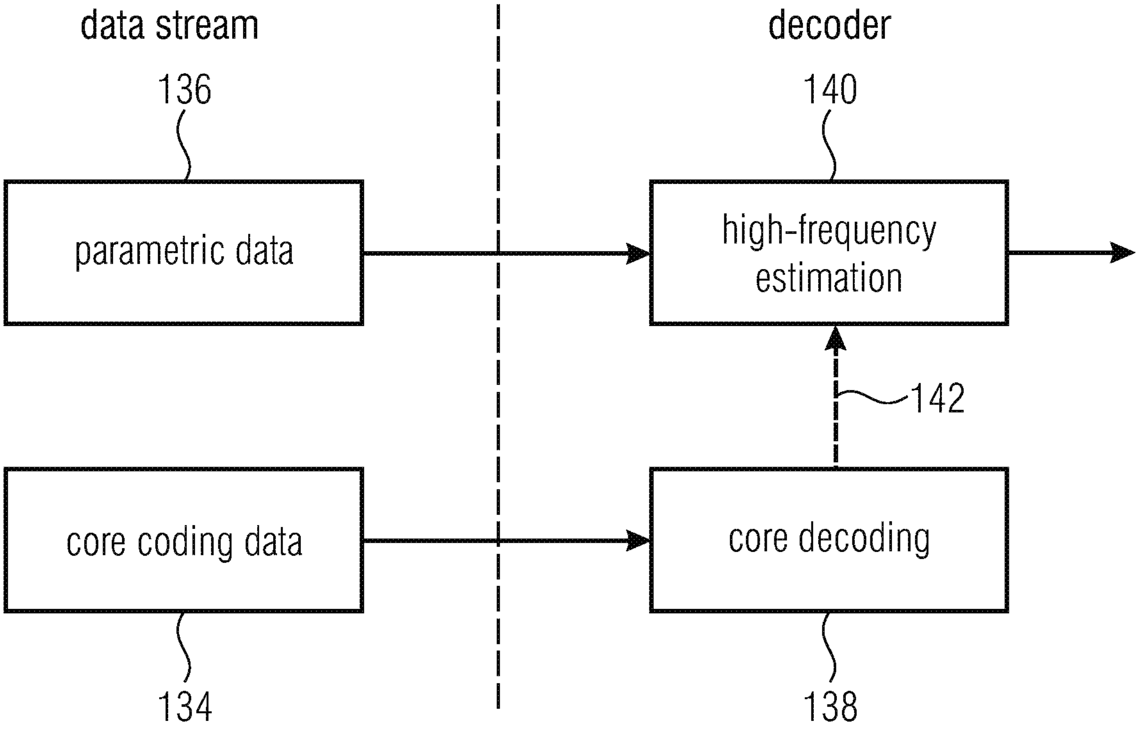

The core coding modes illustrated with respect to FIGS. 6*a* to 6*c* tend to code the audio signal with substantial spectrally constant energy preserving property from 0 frequency to the maximum core coding frequency $f_{core}$. However, the coding mode illustrated with respect to FIG. 6*d* is different in this regard. FIG. 6*d* illustrates a guided bandwidth extension mode such as SBR or the like. In this case, the data stream comprises for respectively coded portions of the audio signal, core coding data 134 and in addition to this, parametric data 136. The core coding data 134 describes the audio signal's spectrum from up to $f_{core}$ and may comprise 112 and 116, or 122 and 124, or 128 and 130. The parametric data 136 parametrically describes the audio signal's spectrum in a bandwidth extension portion spectrally positioned at a higher frequency side of the core coding bandwidth extending from 0 to $f_{core}$. The decoder subjects the core coding data 134 to core decoding 138 so as to recover the audio signal's spectrum within the core coding bandwidth, i.e. up to $f_{core}$, and subjects the parametric data to a high-frequency estimation 140 so as to recover/estimate the audio signal's spectrum above $f_{core}$ up to $f_{BWE}$ representing the effective coded bandwidth of the coding mode of FIG. 6*d*. As shown by dashed line 142, the decoder may use the reconstruction of the audio signal's spectrum up to $f_{core}$ as obtained by the core decoding 138, either in the spectral domain or in the temporal domain, so as to obtain an estimation of the audio signal's fine structure within the bandwidth extension portion between $f_{core}$ and $f_{BWE}$, and spectrally shape this fine structure using the parametric data 136, which for instance describes the spectral envelope within the bandwidth extension portion. This would be the case, for example, in SBR. This would result in a reconstruction of the audio signal at the high-frequency estimation's 140 output.

An blind BWE mode would merely comprise the core coding data, and would estimate the audio signal's spectrum above the core coding bandwidth using extrapolation of the audio signal's envelope into the higher frequency region above $f_{core}$, for example, and using artificial noise generation and/or spectral replication from core coding portion to the higher frequency region (bandwidth extension portion) in order to determine the fine structure in that region.

Back to $f_1$ and $f_{max}$ of FIGS. 4 and 5, these frequencies may represent the upper bound frequencies of a core coding mode, i.e. $f_{core}$, both or one of them, or may represent the upper bound frequency of a bandwidth extension portion, i.e. $f_{BWE}$, either both of them or one of them.

Figure 7A:
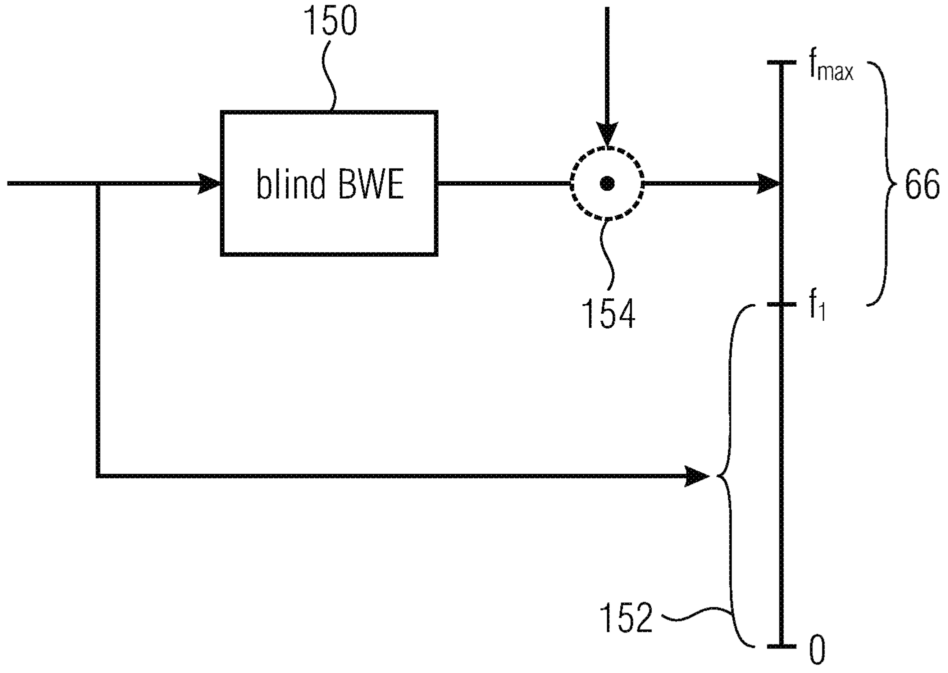
FIGS. 7*a*-7*c* show schematically different ways how a decoder may perform the temporary temporal smoothing/blendings of FIGS. 4 and 5 at the switching instances.
Figure 7B:
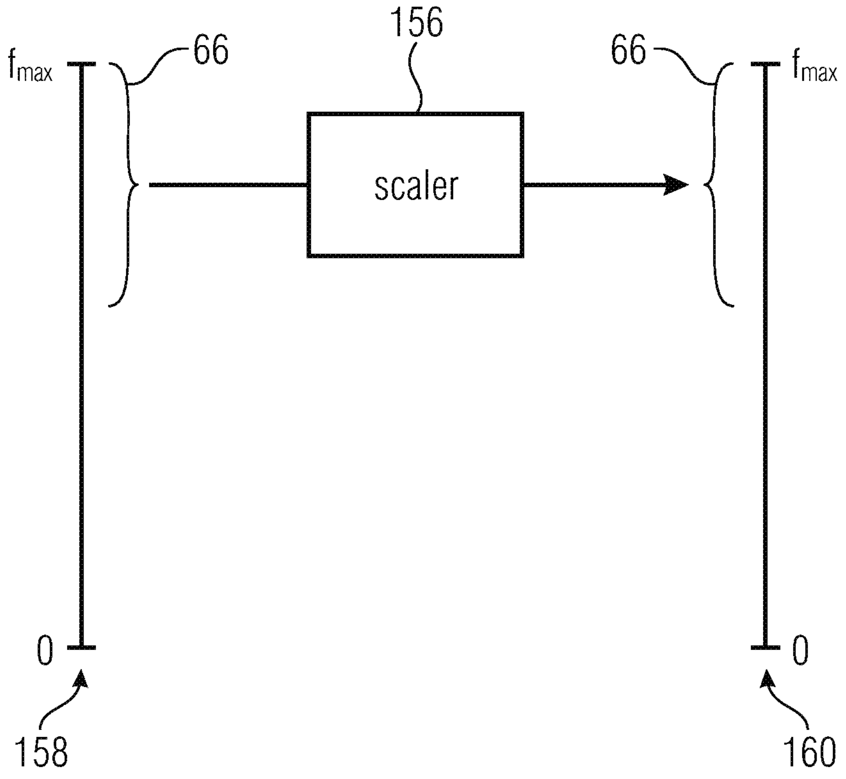
Figure 7C:
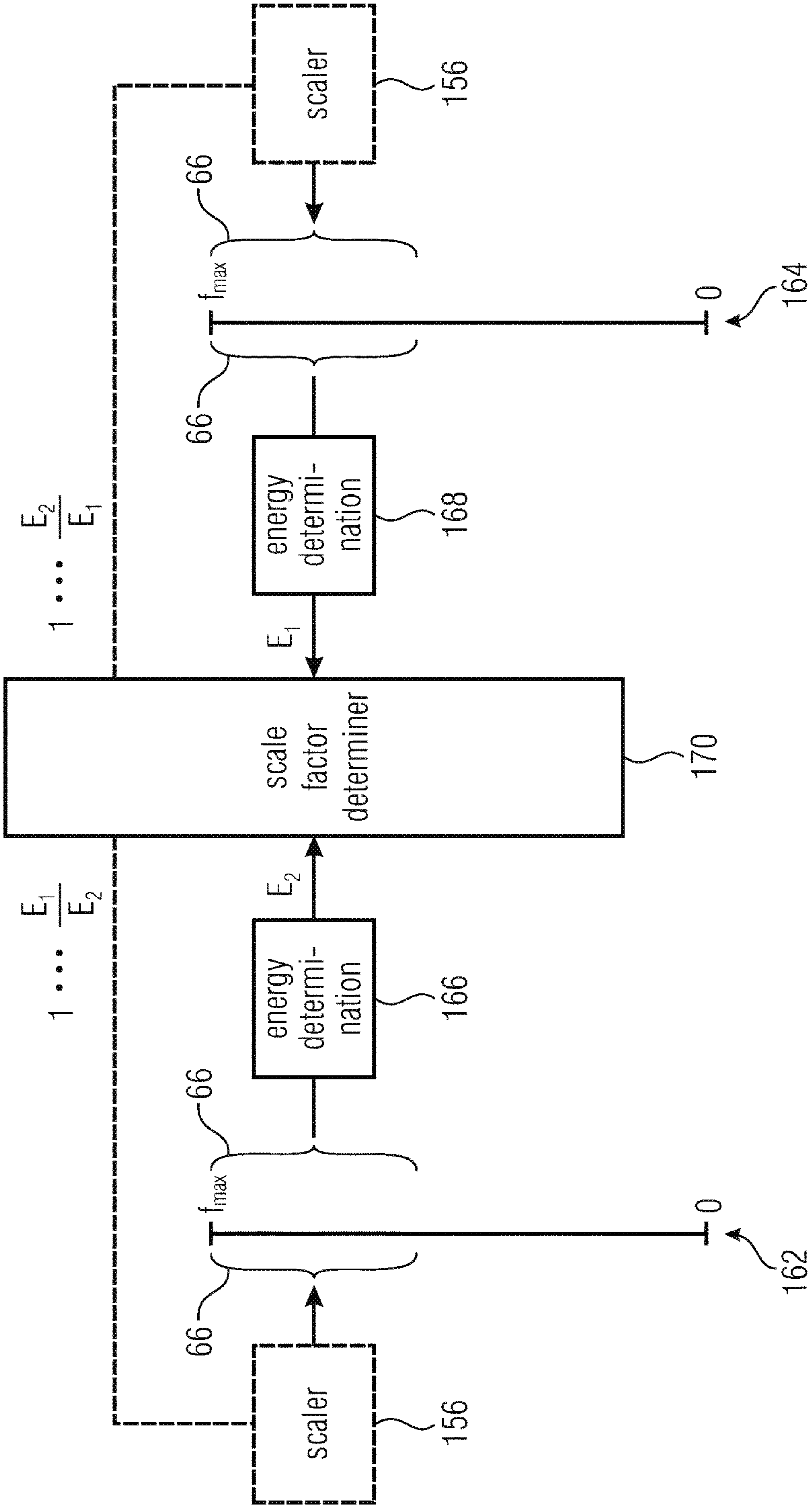

For the sake of completeness, FIGS. 7*a* to 7*c* illustrate three different ways of realizing the temporal smoothing and temporal blending options outlined above with respect to FIGS. 4 and 5. FIG. 7*a*, for example, illustrates the case where the decoder 50, responsive to a switching instance, uses blind BWE 150 so as to, preliminarily during the respective temporary time period, add to the respective coding mode's effectively coded bandwidth 152 an estimation of the audio signal's spectrum within a bandwidth extension portion which coincides with the high-frequency spectral band 66. This was the case in all of the examples 68 to 74 and 98 to 104 of FIGS. 4 and 5. A dotted filling has been used to indicate the blind BEW in the resulting energy preserving property. As shown in these examples, the decoder may additionally scale/shape the result of the blind bandwidth extension estimation in a scaler 154, such as, for example, using a fade-in or fade-out function.

FIG. 7*b* shows the decoder's 50 functionality in case of, respective to a switching instance, scaling in a scaler 156 the audio signal's spectrum 158 as obtained by one of the coding modes between which the respective switching instance takes place, within the high-frequency spectral band 66 and preliminarily during the respective temporary time period, so as to result in a modified audio signal's spectrum 160. The scaling of scaler 156 may be performed in the spectral domain, but another possibility would exist as well. The alternative of FIG. 7*b* takes place, for example, in the examples 70, 74, 100, 102 and 104 of FIGS. 4 and 5.

A specific variant of FIG. 7*b* is shown in FIG. 7*c*. FIG. 7*c* shows a way to perform any of the temporal smoothings exemplified at 70, 74, 102 and 104 of FIGS. 4 and 5. Here, the scale factor used for scaling in the high-frequency spectral band 66 is determined on the basis of energies determined from the audio signal's spectrum as obtained using the respective coding modes, preceding and succeeding the switching instance. 162, for example, shows the audio signal's spectrum of the audio signal in a temporal portion preceding or succeeding the switching instance, where the effective coded bandwidth of this coding mode reaches from 0 to $f_{max}$. At 164, the audio signal's spectrum of that temporal portion is shown, which lies at the other temporal side of the switching instance, coded using a coded mode, the effective coded bandwidth of which reaches from 0 to $f_{max}$ as well. One of the coding modes, however, has a reduced energy preserving property within the high-frequency spectral band 66. By energy determination 166 and 168, the energy of the audio signal's spectrum within the high-frequency spectral band 66 is determined, once from the spectrum 162, once from the spectrum 164. The energy determined from spectrum 164 is indicated, for example, as $E_1$, and the energy determined from spectrum 162 is indicated, for example, using $E_2$. A scale factor determiner then determines a scale factor for scaling spectrum 162 and/or spectrum 164 via scaler 156 within the high-frequency spectral band 66 during the temporary time period mentioned in FIGS. 4 and 5, wherein the scale factor used for spectrum 164 lies, for example, between 1 and $E_2/E_1$, both inclusively, and the scale factor for the scaling performed on spectrum 162 between 1 and $E_1/E_2$, both inclusively, or is set constantly between both bounds, both exclusively. A constant setting of the scaling factor by a scale factor determiner 170 was used, for instance, in the examples 102, 104 and 70, whereas a continuous variation with a temporally changing scaling factor was presented/is exemplified at 74 in FIG. 4.

That is, FIGS. 7*a* to 7*c* show functionalities of decoder 50, which are performed by decoder 50 responsive to a switching instance within a temporary time portion at the switching instance, such as succeeding the switching instance, crossing the switching instance or even preceding the same as outlined above with respect to FIGS. 4 and 5.

With respect to FIG. 7*c*, it is noted that the description of FIG. 7*c* preliminarily neglected an association of spectrum 162 as belonging to the temporal portion preceding the respective switching instance and/or as the temporal portion coded using the coded mode having the higher energy preserving property in the high-frequency spectral band, or not. However, the scale factor determiner 170 could, in fact, take into account which of spectrums 162 and 164 is coded using the coding mode having higher energy preserving property within band 66.

Scale factor determiner 170 could treat transitions by coding mode switchings differently depending on the direction of switching, i.e. from a coding mode with higher energy preserving property to a coding mode with lower energy preserving property as far as the high-frequency spectral band is concerned and vice versa, and/or dependent on an analysis of a temporal course of energy of the audio signal in an analysis spectral band as will be outlined in more detail below. By this measure, the scale factor determiner 170 could set the degree of "low pass filtering" of the audio signal's energy within the high-frequency spectral band temporally, so as to avoid unpleasant "smearings". For example, the scale factor determiner 170 could reduce the degree of low pass filtering in areas where an evaluation of the audio signal's energy course within the analysis spectral band suggests that the switching instance takes place at a temporal instance where a tonal phase of the audio signal's content abuts an attack or vice versa so that the low pass filtering would rather degrade the audio signal's quality resulting at the decoder's output rather than improving the same. Likewise, the kind of "cut-off" of energy components at the end of an attack in the audio signal's content, in the high-frequency spectral band, tends to degrade the audio signal's quality more than cut-offs in the high-frequency spectral band at the beginning of such attacks, and accordingly scale factor determiner 170 may advantageously reduce the low-pass filtering degree at transitions from a coding mode having lower energy preserving property in the high-frequency spectral band to a coding mode having higher energy preserving property in that spectral band.

It is worthwhile to note that in case of FIG. 7*c*, the smoothing of the energy preserving property in a temporal sense within the high-frequency spectral band is actually performed in the audio signal's energy domain, i.e. it is performed indirectly by temporally smoothing the audio signal's energy within that high-frequency spectral band. As long as the audio signal's content is of the same type around switching instances, such as of a tonal type or an attack or the like, the smoothing thus performed effectively results in a like smoothing of the energy preserving property within the high-frequency spectral band. However, this assumption may not be maintained as, as outlined above with respect to FIG. 3 for example, switching instances are forced on the encoder externally, i.e. from outside, and accordingly may occur even concurrently to transitions from one audio signal content type to the other. The embodiment described below with respect to FIGS. 8 and 9 thus seeks to identify such situations so as to suppress the decoder's temporal smoothing responsive to a switching instance in such cases, or to reduce the degree of temporal smoothing performed in such situations. Although the embodiment described further below focuses on temporal smoothing functionality upon coding mode switching, the analysis performed further below could also be used in order to control the degree of temporal blending described above as, for example, temporal blending is disadvantageous in that blind BWE has to be used in order to perform the temporal blending at least in accordance with some of the exemplary functionalities described with respect to FIGS. 4 and 5, and in order to confine the speculative performance of blind BWE responsive to switching instances to such a fraction where the quality advantages resulting therefrom exceed the potential degradation of the overall audio quality due to a badly estimated bandwidth extension portion, the below-outlined analysis may even be used in order to suppress, or reduce the amount of, temporal blending.

Figure 8:
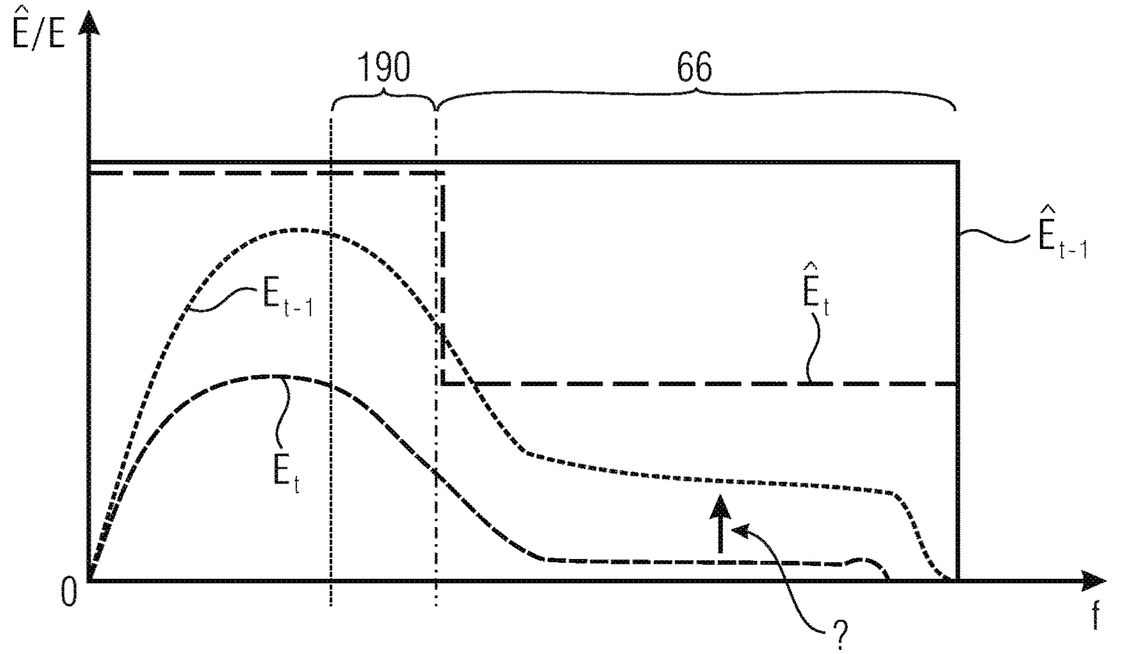
FIG. 8 shows schematically a graph showing examples for spectra of consecutive time portions mutually abutting each other across a switching instance, along with the spectral variation of energy preserving property of the associated coding modes of these temporal portions in accordance with an example in order to illustrate the signal-adaptive control of temporal smoothing/blending of FIG. 9.

FIG. 8 shows in one graph the audio signal's spectrum as coded into the data stream and thus available at the decoder, as well as the energy preserving property of the respective coding mode, for two consecutive time portions, such as frames, of the data stream at a switching instance from a coding mode having higher energy preserving property to a coding mode having lower preserving property, both at the interesting high-frequency spectral band. The switching instance of FIG. 8 is thus of the type illustrated in 56 and FIG. 4 where "t−1" shall denote the time portion preceding the switching instance, and "t" shall index the temporal portions succeeding the switching instance.

As is visible in FIG. 8, the audio signal's energy within the high-frequency spectral band 66 is by far lower in the succeeding temporal portion t than compared in the preceding temporal portion t−1. However, the question is whether this energy reduction should be completely attributed to the energy preserving property reduction in the high-frequency spectral band 66 when transitioning from the coding mode at temporal portion t−1 to the coding mode at temporal portion t.

In the embodiment outlined further below with respect to FIG. 9, the question is answered by way of evaluating the audio signal's energy within an analysis spectral band 190 which is arranged at a lower-frequency side of the high-frequency spectral band 66, such as in a manner immediately abutting the high-frequency spectral band 66 as shown in FIG. 8. If the evaluation shows that the fluctuation of the audio signal's energy within the analysis spectral band 190 is high, it is likely that any energy fluctuation in the high-frequency spectral band 66 is likely to be attributed to an inherent property of the original audio signal rather than an artifact caused by the coding mode switching so that, in that case, any temporal smoothing and/or blending responsive to the switching instance by the decoder should be suppressed, or reduced gradually.

Figure 9:
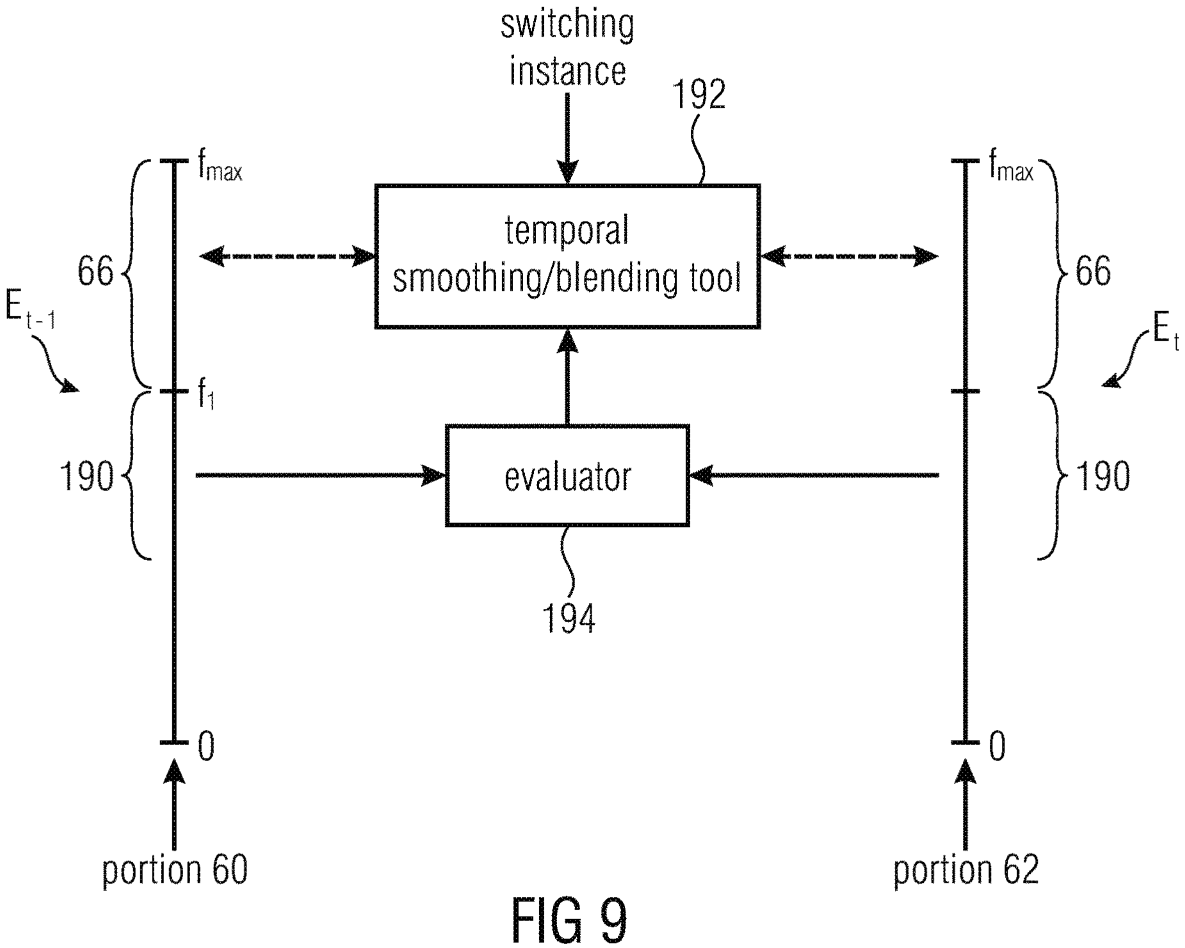
FIG. 9 shows schematically a signal-adaptive control of the temporal smoothing/blending in accordance with an embodiment.

FIG. 9 shows schematically in a manner similar to FIG. 7*c* the decoder's 50 functionality in case of the embodiment of FIG. 8. FIG. 9 shows the spectrum as derivable from the audio signal's temporal portion 60 preceding the current switching instance, indicated using $E_{t-1}$ analogously to FIG. 8, and the spectrum as derivable from the data stream concerning the temporal portion 62 succeeding the current switching instance, indicated using "$E_t$" analogously to FIG. 8. Using reference sign 192, FIG. 9 shows the decoder's temporal smoothing/blending tool which is responsive to a switching instance such as 56 or any other of the above discussed switching instances and may be implemented in accordance with any of the above functionalities such as, for example, implemented in accordance with FIG. 7*c*. Further, an evaluator is provided in the decoder with the evaluator being indicated using reference sign 194. The evaluator evaluates or investigates the audio signal within the analysis spectral band 190. For example, the evaluator 194 uses, to this end, energies of the audio signal derived from portion 60 as well as portion 62, respectively. For example, the evaluator 194 determines a degree of fluctuation in the audio signal's energy in the analysis spectral band 190 and derives therefrom a decision according to which the tool's 190 responsiveness to the switching instance should be suppressed or the degree of temporal smoothing/blending of tool 190 reduced. Accordingly, the evaluator 194 controls tool 190 accordingly. A possible implementation for evaluator 194 is discussed in more detail hereinafter.

In the following, specific embodiments are described in a more detailed manner. As described above, the embodiments outlined further below in more detail seek to obtain seamless transitions between different BWEs and a full-band core, using two processing steps which are performed within the decoder.

The processing is, as outlined above, applied at the decoder-side in the frequency domain, such as FFT, MDCT or QMF domain, in the form of a post-processing stage. Thereinafter, it is described that some steps could be further performed already within the encoder, such as the application of fade-in blending into the wider effective bandwidth such as full-band core.

Figure 10:
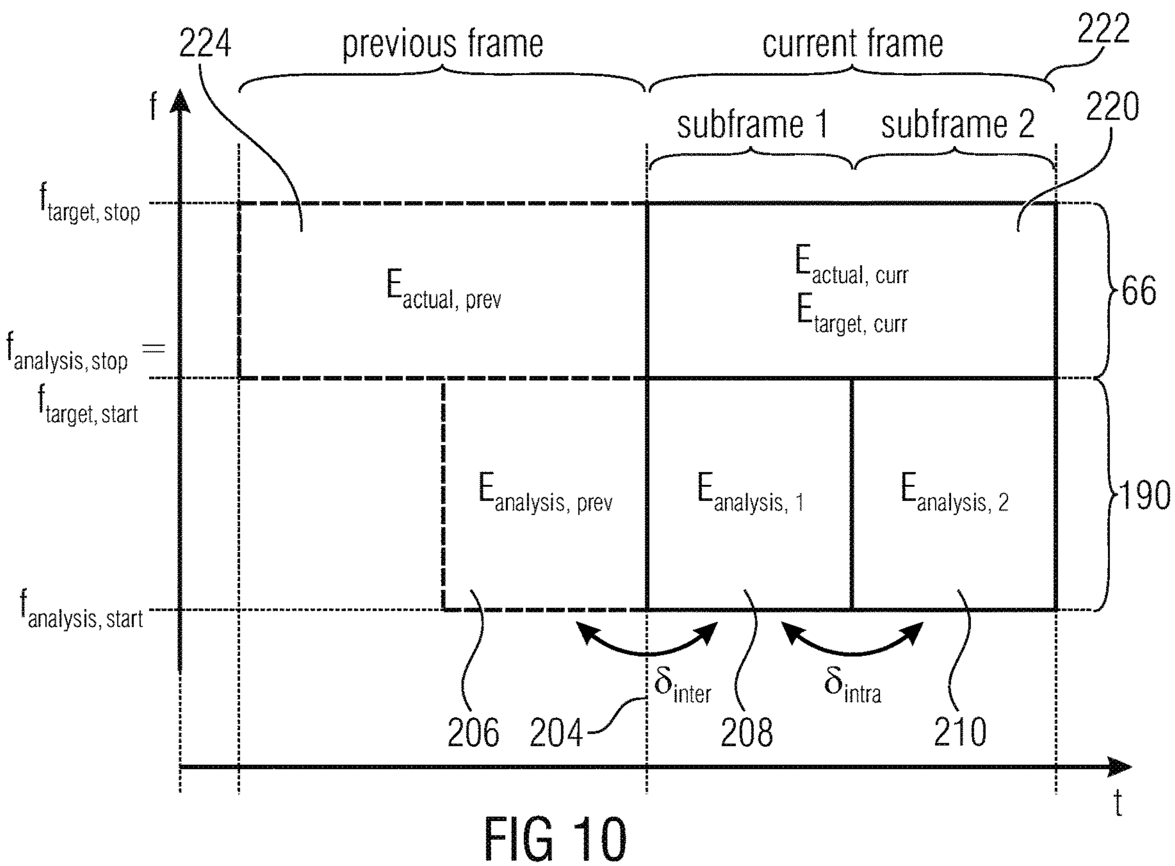
FIG. 10 shows the positions of spectrotemporal tiles at which energies are evaluated and used in accordance with a specific signal-adaptive smoothing embodiment.

In particular, with respect to FIG. 10, a more detailed embodiment is described as to how to implement signal-adaptive smoothing. The embodiment described next is insofar a possibility of implementing the above embodiment according to 70, 102 of FIGS. 4 and 5 using the alternative shown in FIG. 7*c* for setting the respective scale factor for scaling during the temporary period 80 and 108, respectively, and using the signal-adaptivity as outlined above with respect to FIG. 9 for restricting the temporal smoothing to instances where the smoothing brings along advantages.

The purpose of the signal-adaptive smoothing is to obtain seamless transitions by preventing from unintended energy jumps. On the contrary, energy variations that are present in the original signal need to be preserved. The latter circumstance has also been discussed above with respect to FIG. 8.

Hence, in accordance with a signal-adaptive smoothing function at the decoder side described now, the following steps are performed wherein reference is made to FIG. 10 for the clarification and dependencies of the values/variables used in explaining this embodiment.

Figure 11:
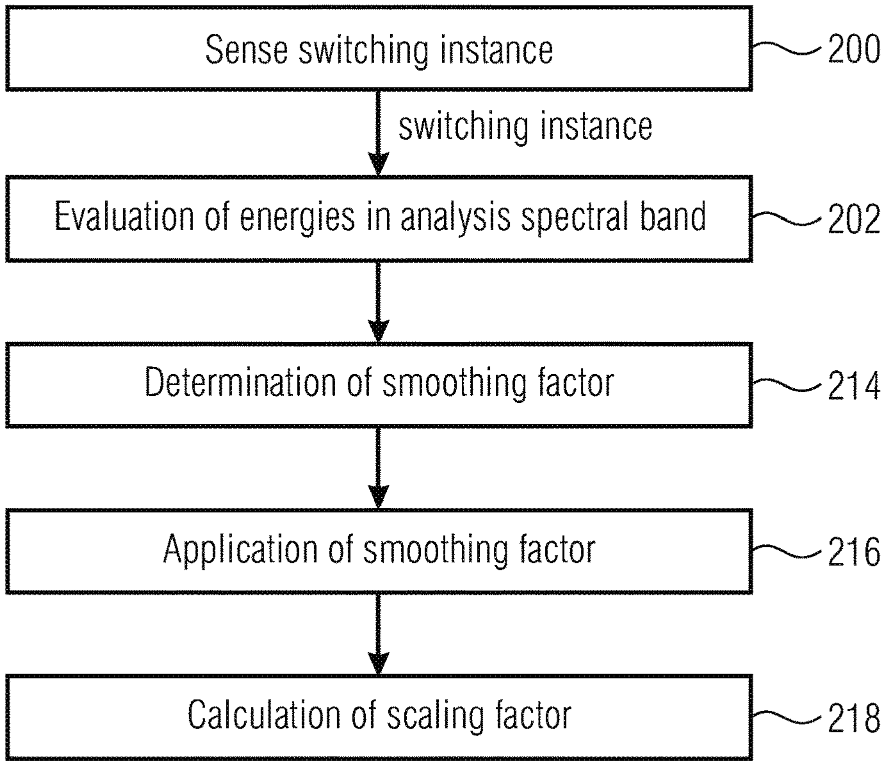
FIG. 11 shows a flow diagram performed in accordance with a signal-adaptive smoothing embodiment within a decoder.

As shown in the flow diagram of FIG. 11, the decoder continuously senses whether there is currently a switching instance or not at 200. If the decoder comes across a switching instance, the decoder performs an evaluation of energies in the analysis spectral band. The evaluation 202 may, for example, comprise a calculation of the intra-frame and inter-frame energy differences $\delta_{intra}$, $\delta_{inter}$ of the analysis spectral band, here defined as the analysis frequency range between $f_{analysis,start}$ and $f_{analysis,stop}$. The following calculations may be involved:

$$\delta_{intra}=E_{analysis,2}-E_{analysis,1}$$

$$\delta_{inter}=E_{analysis,1}-E_{analysis,prev}$$

$$\delta_{max}=\max(|\delta_{intra}|,|\delta_{inter}|)$$

That is, the calculation could for example calculate the energy difference between energies of the audio signal as coded into the data stream in the analysis spectral band, once sampled from temporal portions, i.e. subframe 1 and subframe 2 in FIG. 10, both lying subsequently to the switching instance 204 and ones sampled at temporal portions lying at opposite temporal sides of the switching instance 204. A maximum of the absolute of both differences may also be derived, namely $\delta_{max}$. The energy determination may be done using a summation over squares of the spectral line values within a spectrotemporal tile temporally extending over the respective temporal portion, and spectrally extending over the analysis spectral band. Although FIG. 10 suggests that the temporal length of the temporal portions within which the energy minuend and energy subtrahend is determined, is equal to each other, this is not necessarily the case. The spectrotemporal tiles over which the energy minuends/subtrahends are determined are shown in FIG. 10 at 206, 208 and 210, respectively.

Thereinafter, at 214, the calculated energy parameters resulting from the evaluation in step 202 are used to determine the smoothing factor $\alpha_{smooth}$. In accordance with one embodiment, $\alpha_{smooth}$ is set dependent on the maximum energy difference $\delta_{max}$, namely so that $\alpha_{smooth}$ is bigger the smaller $\delta_{max}$ is. $\alpha_{smooth}$ is within the interval [0 . . . 1], for example. While the evaluation in 202 is performed, for example, by evaluator 194 of FIG. 9, the determination of 214 is, for example, performed the scale factor determiner 170.

The determination in step 214 of the smoothing factor $\alpha_{smooth}$ may, however, also take into account the sign of the maximally valued one of the difference values $\delta_{intra}$ and $\delta_{inter}$, i.e. sign of $\delta_{intra}$ if the absolute of $\delta_{intra}$ is higher than the absolute value of $\delta_{inter}$, and the sign of $\delta_{inter}$ if the absolute value of $\delta_{inter}$ is greater than the absolute value of $\delta_{intra}$.

In particular, for energy drops that are present in the original audio signal, less smoothing needs to be applied to prevent energy smearing to originally low-energy regions, and accordingly $\alpha_{smooth}$ could be determined in step 214 to be lower in value in case the sign of the maximum energy difference indicates an energy drop in the audio signal's spectrum within the analysis spectral band 190.

In step 216, the smoothing factor $\alpha_{smooth}$ determined in step 214, is then applied to the previous energy value determined from the spectrotemporal tile preceding the switching instance, in the high-frequency spectral band 66, i.e. $E_{actual,prev}$, and the current, actual energy determined from a spectrotemporal tile in the high-frequency spectral band 66 following the switching instance 204, i.e. $E_{actual,curr}$, to get the target energy $E_{target,curr}$ of the current frame or temporal portion forming the temporary period at which the temporal smoothing is to be performed. According to the application 216, the target energy is calculated as $$E_{target,curr}=\alpha_{smooth}\cdot E_{actual,prev}+(1-\alpha_{smooth})\cdot E_{actual,curr}.$$

The application in 216 would be performed by scale factor determiner 170 as well.

The calculation of the scaling factor to be applied to the spectrotemporal tile 220 extending over the temporary period 222 along the temporal axis t, and extending over the high-frequency spectral band 66 along the spectral axis f, in order to scale the spectral samples x within that defined target frequency range $f_{target,start}$ to $f_{target,stop}$ towards the current target energy may then involve $$\alpha_{scale}=\sqrt{E_{target,curr}/E_{actual,curr}}$$

$$x_{new}\times\alpha_{scale}\cdot x_{old}.$$

While the calculation of $\alpha_{scale}$ would, for example, be performed by the scale factor determined 170, the multiplication using $\alpha_{scale}$ as a factor, would be performed by the aforementioned scaler 156 within the spectrotemporal tile 220.

For the sake of completeness, it is noted that the energies $E_{actual,prev}$ and $E_{actual,curr}$ may be determined in the same manner as described above with respect to the spectrotemporal tiles 206 to 210: a summation over the squares of the spectral values within the spectrotemporal tile 224 temporally preceding the switching instance 204 and extending over the high-frequency spectral band 66 may be used to determined $E_{actual,prev}$ and a summation over squares of the spectral values within the spectrotemporal tiles 220 may be used to determined $E_{actual,curr}$.

It is noted that in the example of FIG. 10, the temporal width of the spectrotemporal tile 220 was exemplarily two times the temporal width of the spectrotemporal tiles 206 to 210, but this circumstance is not critical but may be set differently.

Next, a concrete, more detailed embodiment for performing the temporal blending is described. This bandwidth blending has, as described above, the purpose to suppress annoying bandwidth fluctuations on the one hand, and enable that each coding mode neighboring a respective switching instance may be run at its intended effective coded bandwidth. For example, smooth adaptation may be applied to enable that each BWE may be run at its intended optimal bandwidth.

Figure 12:
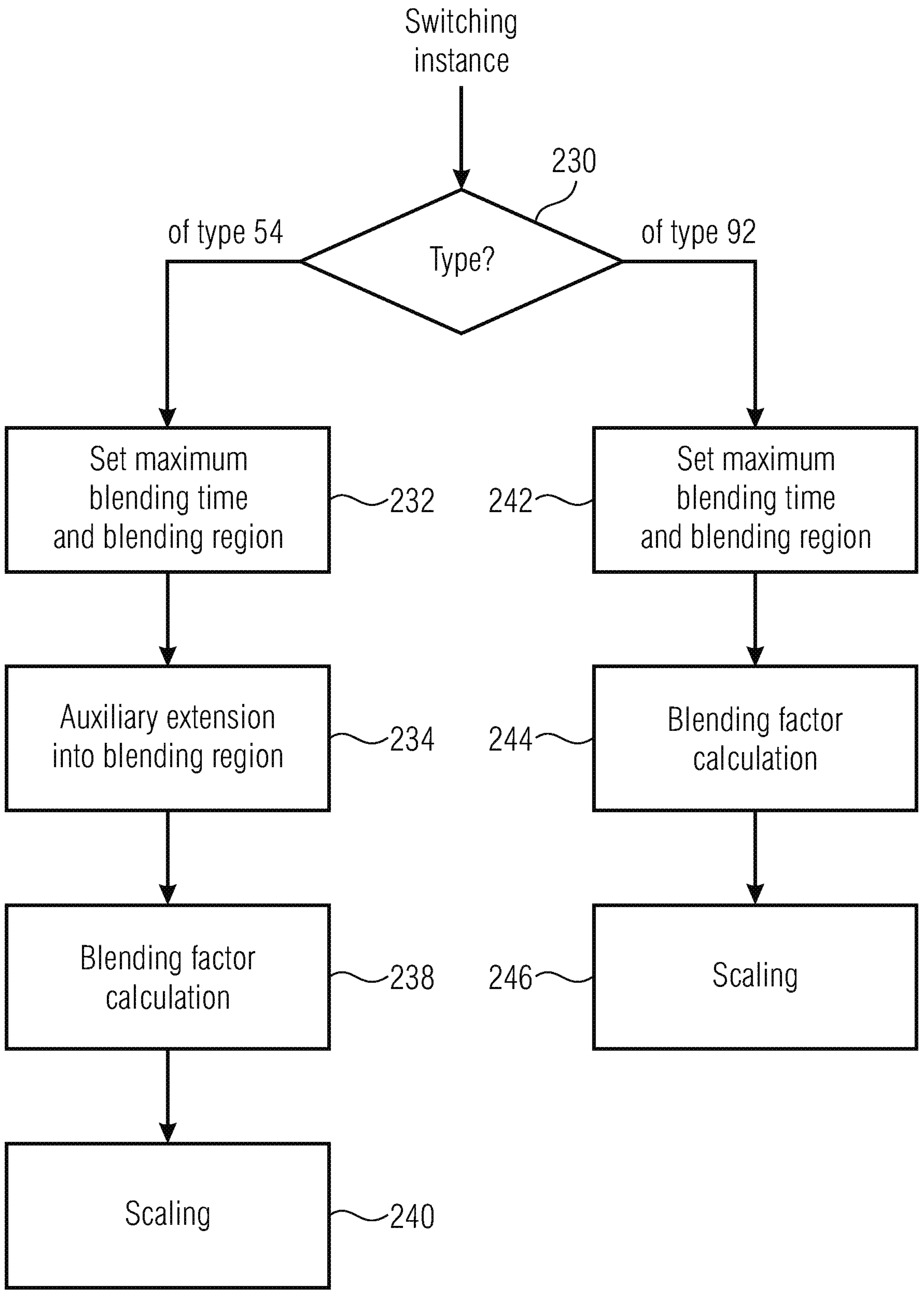
FIG. 12 shows a flow diagram of a bandwidth blending performed within a decoder in accordance with an embodiment.

The following steps are performed by the decoder: as shown in FIG. 12, upon a switching instance, the decoder determiners the type of the switching instance at 230, so as to discriminate between switching instances of type 54 and type 92. As described in FIGS. 4 and 5, fade-out blending is performed in the case of type 54, and fade-in blending is performed in the case of switching type 92. The fade-out blending is described first additionally referring to FIGS. 13*a* and 13*b*. That is, if the switching type 54 is determined in 230, a maximum blending time $t_{blend,max}$ is set as well as the blending region is determined spectrally, i.e. the high-frequency spectral band 66 at which the effective coded bandwidth of the higher bandwidth coding mode exceeds the effective coded bandwidth of the lower bandwidth coding mode between which the switching instance of type 54 takes place. This setting 232 may involve the calculation of a bandwidth difference $f_{BW1}-f_{BW2}$ with $f_{BW1}$ denoting the maximum frequency of the effective coded bandwidth of the higher bandwidth coding mode and $f_{BW2}$ indicating the maximum frequency of the effective coded bandwidth of the lower bandwidth coding mode which difference defines the blending region, as well as a calculation of a predefined maximum blending time $t_{blend,max}$. The latter time value may be set to a default value or may be determined differently as is explained later in connection with switching instances occurring during a current blending procedure.

Figure 13A:
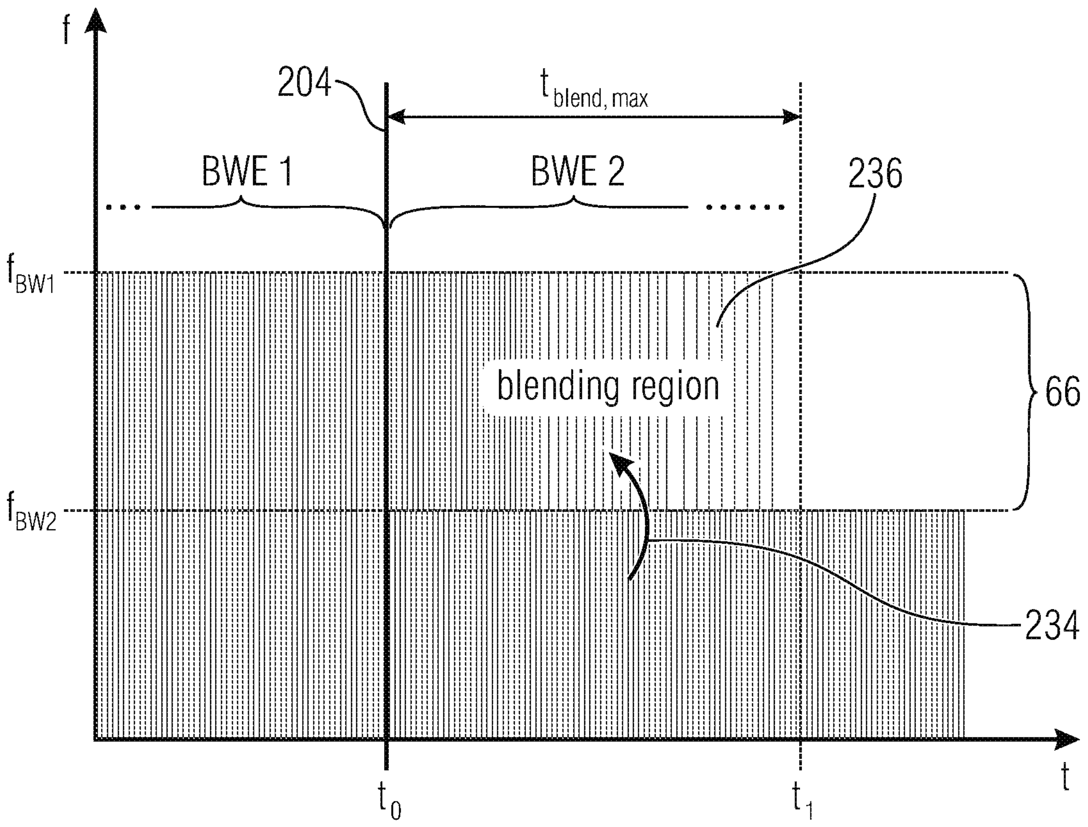
FIG. 13*a* shows a spectrotemporal portion around the switching instance in order to illustrate the spectrotemporal tile within which the blending is performed in accordance with FIG. 12.

Then, in step 234 an enhancement of the coding mode after the switching instance 204 is performed so as to result in an auxiliary extension 234 of the bandwidth of the coding mode after the switching instance 204 into the blending region or high-frequency spectral band 66 so as to fill this blending region 66 gaplessly during $t_{blend,max}$, i.e. so as to fill the spectrotemporal tile 236 in FIG. 13*a*. As this operation 234 may be performed without control via side information in the data stream, the auxiliary extension 234 may be performed using blind BWE.

Then, in 238 a blending factor $w_{blend}$ is calculated, where $t_{blend,act}$ denotes the actual elapsed time since the switching, here exemplarily at $t_0$:

$$w_{blend}=(t_{blend,max}-t_{blend,act})/t_{blend,max}$$

Figure 13B:
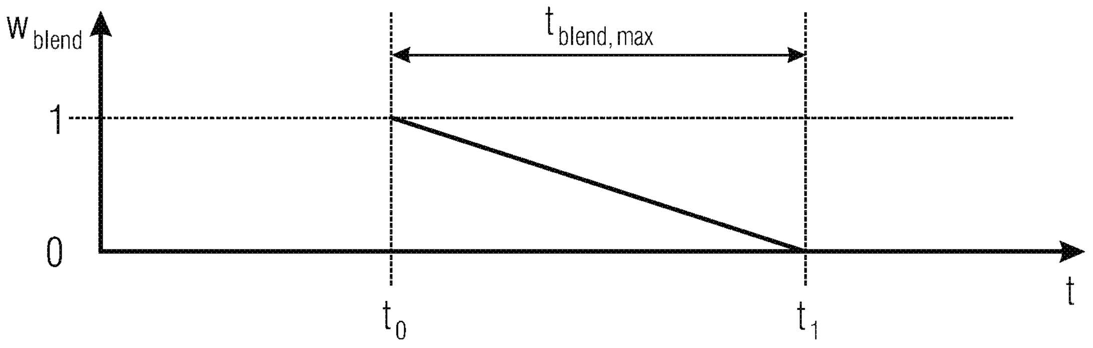
FIG. 13*b* shows the temporal variation of the blending factor in accordance with the embodiment of FIG. 12.

The temporal course of the blending factor thus determined is illustrated in FIG. 13*b*. Although the formula illustrates an example for linear blending, other blending characteristics are possible as well such as quadratic, logarithmic, etc. At this occasion it should generally be noted that characteristic of blending/smoothing does not have to be uniform/linear or even be monotonic. All increases/decreases mentioned herein do not necessarily be montonic Thereinafter, in 240, the weighting of the spectral samples x within the spectrotemporal tile 236, i.e. within the blending region 66 during the temporary period defined, or limited to, the maximum blending time is performed using the blending factor $w_{blend}$ according to $$x_{new}=w_{blend}\cdot x_{old}$$

That is, in the scaling step 240, the spectral values within spectrotemporal tile 236 are scaled according to $w_{blend}$, to be more precise namely the spectral values temporally succeeding the switching instance 204 by $t_{blend,act}$ are scaled according to $w_{blend}(t_{blend,act})$.

In case of a switching type 92, the setting of maximum blending time and blending region is performed at 242 in a manner similar to 232. The maximum blending time $t_{blend,max}$ for switching types 92 may be different to $t_{blend,max}$ set in 232 in the case of a switching type 54. Reference is made also to the subsequent description of switching during blending.

Then, the blending factor is calculated, namely $w_{blend}$. The calculation 244 may calculate the blending factor dependent on the elapsed time since the switching at $t_0$, i.e. depending on $t_{blend,act}$ according to paragraph $$w_{blend}=t_{blend,act}/t_{blend,max}$$

Then the actual scaling in 246 takes place using the blending factor in a manner similar to 240.

Switching During Blending

Figure 14A:
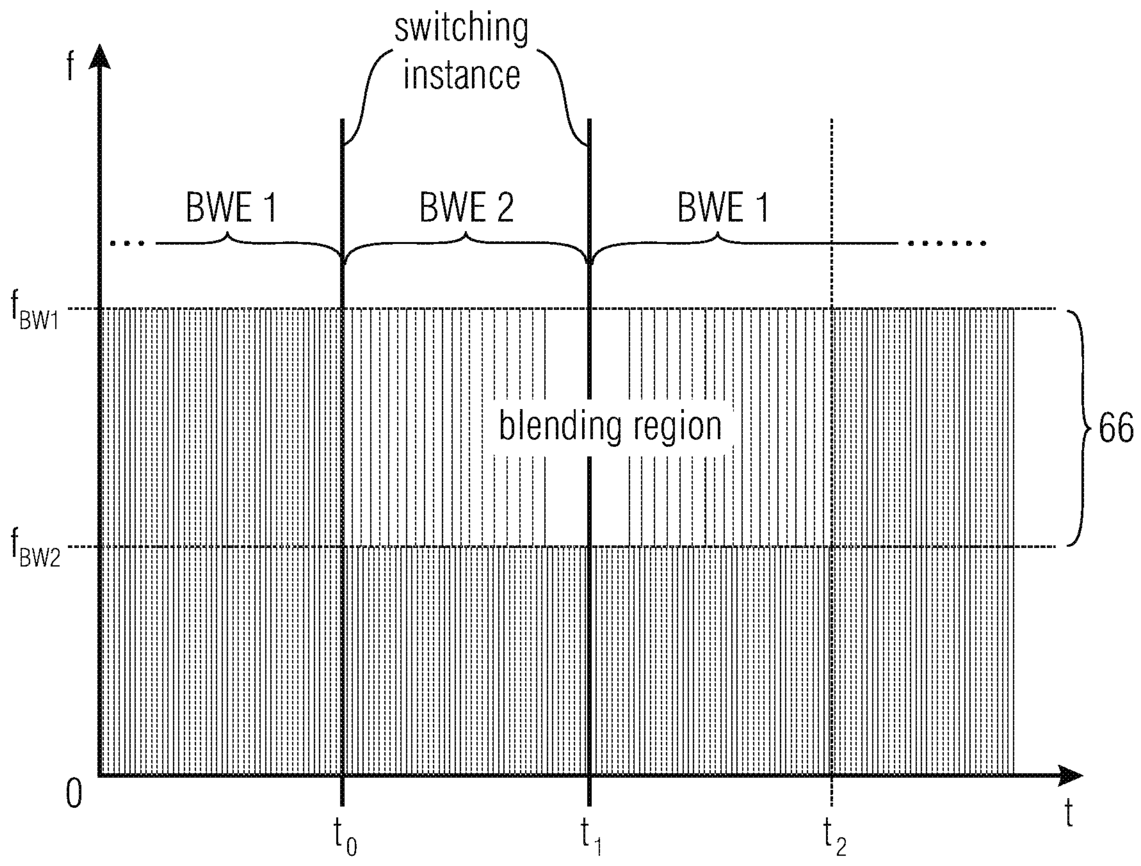
FIG. 14*a* shows schematically a variation of the embodiment of FIG. 12 in order to account for switching instances occurring during blending.
Figure 14B:
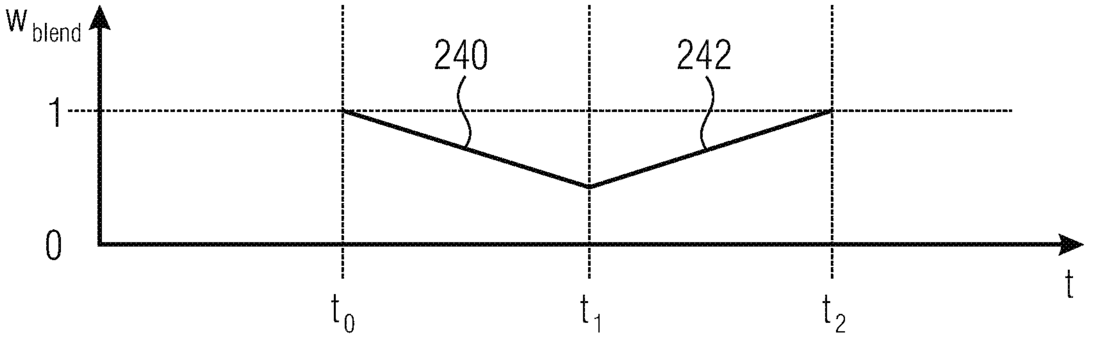
FIG. 14*b* shows the resulting variation of the temporal variation of the blending factor in case of the variant of FIG. 14*a*.

Nevertheless, the above-mentioned approach only works, if during the blending process no further switching takes place, as shown in FIG. 14*a* at $t_1$. In that case, the blending factor calculation is switched from fade-out to fade-in and the elapsed time value is updated by $$t_{blend,act}=t_{blend,max}-t_{blend,act}$$

resulting in a reverted blending process completed at $t_2$ as shown in FIG. 14*b*.

Thus, this modified update would be performed in steps 232 and 242 in order to account for the interrupted fade-in or fade-out process, interrupted by the new, currently occurring switching instance, here exemplarily at $t_1$. In other words, the decoder would perform the temporal smoothing or blending at a first switching instance $t_0$ by applying a fade-out (or fade-in) scaling function 240 and, if a second switching instance $t_1$ occurs during the fade-out (or fade-in) scaling function 240, apply, again, a fade-in (or fade-out) scaling function 242 to a high-frequency spectral band 66 so as to perform temporal smoothing or blending at the second switching instance $t_1$, with setting a starting point of applying the fade-in (or fade-out) scaling function 242 from the second switching instance $t_2$ on such that the fade-in (or fade-out) scaling function 242 applied at the second switching instance $t_2$ has, at the starting point, a function value nearest to—or equal to a function value assumed by the fade-out (or fade-in) scaling function 240 as applied at the first switching instance, at the time $t_2$ of occurrence of the second switching instance.

The embodiments described above relate to audio and speech coding and particularly to coding techniques using different bandwidth extension methods (BWE) or non-energy preserving BWE(s) and a full-band core-coder without a BWE in a switched application. It has been proposed to enhance the perceptual quality by smoothing the transitions between different effective output bandwidths. In particular, a signal-adaptive smoothing technique is used to obtain seamless transitions, and a possibly, but not necessarily uniform blending technique between different bandwidths to achieve the optimal output bandwidth for each BWE while disturbing bandwidth fluctuations are avoided.

Unintended energy jumps when switching between different BWEs or full-band core are avoided by way of the above embodiments whereas in- and decreases that are present in the original signal (e.g. due to on- or offsets of sibilants) may be preserved. Furthermore, smooth adaptions of the different bandwidths are exemplarily performed to enable each BWE to be run at its intended, optimal bandwidth if it needs to be active for a longer period.

Except for the decoder's functionalities at switching instances necessitating blind BWE, same functionalities may also be taken over by the encoder. The encoder such as 30 of FIG. 3, then, applies the functionalities described above, onto the original audio signal's spectrum as follows.

For example, if the encoder 30 of FIG. 3 is able to forecast, or experiences a little bit in advance, that a switching instance of type 54 will happen, the encoder may for example preliminarily, during a temporary time period directly preceding the switching instance, encode the audio signal in a modified version according to which, during the temporary time period, the high-frequency spectral band of the audio signal spectrum is temporally shaped using a fade-out function, starting for example with 1 at the beginning of the temporary time period and getting 0 at the end of the temporary time period, the end coinciding with the switching instance. The encoding of the modified version could for example include first encoding the audio signal in the temporal portion preceding the switching instance in its original version up to a syntax-level, for example, then scaling spectral line values and/or scale factors concerning the high-frequency spectral band 66 during the temporary time period with the fade-out function. Alternatively, the encoder 30 may alternatively first modify the audio signal and the spectral domain so as to apply the fade-out scale function onto the spectrotemporal tile in the high-frequency spectral band 66, extending over the temporary time period, and then secondly encoding the respectively modified audio signal.

Upon encountering a switching instance of type 56, the encoder 30 could act as follows. The encoder 30 could, preliminarily for a temporary time period directly starting at the switching instance, amplify, i.e. scale-up, the audio signal within the high-frequency spectral band 66, with or without a fade-out scaling function, and could then encode the thus modified audio signal. Alternatively, the encoder 30 could first of all encode the original audio signal using the coding mode valid directly after the switching instance up to some syntax element level, with then amending the latter so as to amplify the audio signal within the high-frequency spectral band during the temporary time period. For example, if the coding mode to which the switching instance takes place involves a guided bandwidth extension into the high-frequency spectral band 66, the encoder 30 could appropriately scale-up the information on the spectral envelope concerning this high-frequency spectral band during the temporary time period.

However, if the encoder 30 encounters a switching instance of type 92, the encoder 30 could either encode the temporal portion of the audio signal following the switching instance unmodified up to some syntax element level and then amending, for example, same in order to subject the high-frequency spectral band of the audio signal during that temporary time period to a fade-in function, such as by appropriately scaling scale factors and/or spectral line values within the respective spectrotemporal tile, or the encoder 30 first modifies the audio signal within the high-frequency spectral band 66 during the temporary time period immediately starting at the switching instance, with then encoding the thus modified audio signal.

When encountering a switching instance of type 94, the encoder 30 could for example act as follows: the encoder could, for a temporary time period immediately starting at the switching instance, scale-down the audio signal's spectrum within the high-frequency spectral band 66—by applying a fade-in function or not. Alternatively, the encoder could encode the audio signal at the time portion following the switching instance using the coding mode to which the switching instance takes place, without any modification up to some syntax element level, with then changing appropriate syntax elements so as to provoke the respective scaling-down of the audio signal's spectrum within the high-frequency spectral band during the temporary time period. The encoder may appropriately scale-down respective scale factors and/or spectral line values.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Recommendation ITU-T G.718—Amendment 2: "Frame error robust narrow-band and wideband embedded variable bit-rate coding of speech and audio from 8-32 kbit/s—Amendment 2: New Annex B on superwideband scalable extension for ITU-T G.718 and corrections to main body fixed-point C-code and description text"

[2] Recommendation ITU-T G.729.1—Amendment 6: "G.729-based embedded variable bit-rate coder: An 8-32 kbit/s scalable wideband coder bitstream interoperable with G.729—Amendment 6: New Annex E on superwideband scalable extension"

[3] B. Geiser, P. Jax, P. Vary, H. Taddei, S. Schandl, M. Gartner, C. Guillaumé, S. Ragot: "Bandwidth Extension for Hierarchical Speech and Audio Coding in ITU-T Rec. G.729.1", IEEE Transactions on Audio, Speech, and Language Processing, Vol. 15, No. 8, 2007, pp. 2496-2509

[4] M. Tammi, L. Laaksonen, A. Rämö, H. Toukomaa: "Scalable Superwideband Extension for Wideband Coding", IEEE ICASSP 2009, pp. 161-164

[5] B. Geiser, P. Jax, P. Vary, H. Taddei, M. Gartner, S. Schandl: "A Qualified ITU-T G.729 EV Codec Candidate for Hierarchical Speech and Audio Coding", 2006 IEEE 8$^{th}$ Workshop on Multimedia Signal Processing, pp. 114-118

The invention claimed is:

1. Decoder supporting, and being switchable between, at least two modes so as to decode an information signal, wherein the decoder comprises a microprocessor, an electronic circuit, or a programmed computer configured to, in a first of the at least two modes, decode the information signal within a first bandwidth in a first manner, and in a second of the at least two modes, decode the information signal within a second bandwidth, which is equal to or different from the first bandwidth, in a second manner which is different from the first manner, responsive to a switching instance of at least one of from the first mode to the second mode and from the second mode to the first mode, perform temporal smoothing and/or blending at a transition between a first temporal portion of the information signal, preceding the switching instance, and a second temporal portion of the information signal, succeeding the switching instance, in a manner confined to a high-frequency spectral band which overlaps the first bandwidth and the second bandwidth;

wherein the high-frequency spectral band overlaps with a spectral BWE extension portion of one of the first mode or the second mode.

2. Decoder according to claim 1, wherein each of the first mode and the second mode comprises one or more of guided bandwidth extension, blind bandwidth extension, scalefactor-based transform core coding, and linear-prediction coding.

3. Decoder according to claim 1, wherein the high-frequency spectral band overlaps with a spectral BWE extension portion or transform spectrum portion or linear-predictively coded spectral portion of the first mode or the second mode.

4. Decoder according to claim 1, wherein the decoder is configured to perform the temporal smoothing and/or blending additionally depending on an analysis of the information signal in an analysis spectral band arranged spectrally below the high-frequency spectral band.

5. Decoder according to claim 4, wherein the decoder is configured to determine a measure for an information signal's energy fluctuation in the analysis spectral band and suppress, or set a degree of the temporal smoothing and/or blending dependent on the measure.

6. Decoder according to claim 5, wherein the decoder is configured to compute the measure as the maximum of a first absolute difference between information signal's energies in the analysis spectral band between temporal portions lying at opposite temporal sides of the transition and a second absolute difference between information signal's energies in the analysis spectral band between consecutive temporal portions, both succeeding the transition.

7. Decoder according to claim 4, wherein the analysis spectral band abuts the high-frequency spectral band at a lower spectral side of the high-frequency spectral band.

8. Decoder according to claim 1, wherein the decoder is configured to scale the information signals energy in the high-frequency spectral band in the second temporal portion with a scaling factor which varies between 1 and $$\frac{\text{the information signal's energy in the high-frequency spectral band in the first temporal portion}}{\text{the information signal's energy in the high-frequency spectral band in the second temporal portion}}$$

according to the measure.

9. Method for decoding supporting, and being switchable between, at least two modes so as to decode an information signal, wherein the method comprises, in a first of the at least two modes, decoding, performed by a decoder, the information signal within a first bandwidth in a first manner, and in a second of the at least two modes, decoding the information signal within a second bandwidth, which is equal to or different -from the first bandwidth, in a second manner which is different from the first manner, responsive to a switching instance of at least one of from the first mode to the second mode and from the second mode to the first mode, performing, by a processor, temporal smoothing and/or blending at a transition between a first temporal portion of the information signal, preceding the switching instance, and a second temporal portion of the information signal, succeeding the switching instance, in a manner confined to a high-frequency spectral band which overlaps the first bandwidth and the second bandwidth, wherein at least one of the decoder and/or the processor is implemented by a microprocessor or an electronic circuit;

wherein the high-frequency spectral band overlaps with a spectral BWE extension portion of one of the first mode or the second mode.

10. A non-transitory digital storage medium having a computer program stored thereon that when executed by a microprocessor, an electronic circuit, or a programmed computer performs the method for decoding supporting, and being switchable between, at least two modes so as to decode an information signal, wherein the method comprises, in a first of the at least two modes, decoding the information signal within a first bandwidth in a first manner, and in a second of the at least two modes, decoding the information signal within a second bandwidth, which is equal to or different from the first bandwidth, in a second manner which is different from the first manner, responsive to a switching instance of at least one of from the first mode to the second mode and from the second mode to the first mode, performing temporal smoothing and/or blending at a transition between a first temporal portion of the information signal, preceding the switching instance, and a second temporal portion of the information signal, succeeding the switching instance, in a manner confined to a high-frequency spectral band which overlaps the first bandwidth and the second bandwidth, when said computer program is run by a computer;

wherein the high-frequency spectral band overlaps with a spectral BWE extension portion of one of the first mode or the second mode.

* * * * *